US009001754B2

(12) United States Patent
Kato et al.

(10) Patent No.: US 9,001,754 B2
(45) Date of Patent: Apr. 7, 2015

(54) MOBILE STATION APPARATUS, BASE STATION APPARATUS, WIRELESS COMMUNICATION SYSTEM, AND WIRELESS COMMUNICATION METHOD

(75) Inventors: Yasuyuki Kato, Osaka (JP); Katsunari Uemura, Osaka (JP); Shohei Yamada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 402 days.

(21) Appl. No.: 13/388,912

(22) PCT Filed: Jul. 30, 2010

(86) PCT No.: PCT/JP2010/062951
§ 371 (c)(1),
(2), (4) Date: Mar. 15, 2012

(87) PCT Pub. No.: WO2011/016402
PCT Pub. Date: Feb. 10, 2011

(65) Prior Publication Data
US 2012/0170532 A1 Jul. 5, 2012

(30) Foreign Application Priority Data
Aug. 6, 2009 (JP) ................................. 2009-183633

(51) Int. Cl.
*H04W 4/00* (2009.01)
*H04W 36/00* (2009.01)
(52) U.S. Cl.
CPC ................................ *H04W 36/0072* (2013.01)
(58) Field of Classification Search
CPC ..... H04W 28/06; H04W 72/04; H04W 24/00; H04W 36/00
See application file for complete search history.

(56) References Cited

U.S. PATENT DOCUMENTS

2004/0038680 A1\* 2/2004 Ishiguro et al. ............... 455/436
2007/0293224 A1  12/2007 Wang et al.
(Continued)

FOREIGN PATENT DOCUMENTS

WO  WO 2007/149509 A2  12/2007
WO  WO 2009/020109 A1  2/2009

OTHER PUBLICATIONS

"3rd Generation Partnership Project; Technical Specification Group Radio Access Network; Evolved Universal Terrestrial Radio Access (E-UTRA) and Evòlved Universal Terrestrial Radio Access Network (E-UTRAN); Overall description; Stage 2 (Release 8)," 3GPP TS 36.300, V8.8.0, Mar. 2009, pp. 1-157.

(Continued)

*Primary Examiner* — Anez Ebrahim
(74) *Attorney, Agent, or Firm* — Birch, Stewart, Kolasch & Birch, LLP

(57) ABSTRACT

Provided are a mobile station apparatus, a wireless communication system, and a wireless communication method that can improve reliability of handover while efficiently and early completing the handover. A mobile station apparatus 100 that switches base station apparatuses 200a and 200b to communicate with by handover includes: receiving an HO Command message including scheduled uplink transmission information from the base station apparatus of a handover source 200a; performing uplink transmission to the base station apparatus of a handover destination 200b based on the scheduled uplink transmission information; and executing handover in accordance with a random access procedure if a response is not received from the base station apparatus of a handover destination 200b with respect to a single time or plural times of the uplink transmission.

7 Claims, 22 Drawing Sheets

(56) References Cited

U.S. PATENT DOCUMENTS

2010/0279695 A1* 11/2010 Amirijoo et al. .............. 455/438
2011/0058529 A1    3/2011  Uemura

OTHER PUBLICATIONS

"3rd Generation Partnership Project; Technical Specification Group Radio Access Network; Further Advancements for E-UTRA Physical Layer Aspects (Release 9)," 3GPP TR 36.814, V0.4.1, Feb. 2009, pp. 1-31.
"3rd Generation Partnership Project; Technical Specification Group Radio Access Nework; Evolved Universal Terrestrial Radio Access (E-UTRA); Physical Channels and Modulation (Release 8)," 3GPP TS 36.211, V8.6.0, Mar. 2009, pp. 1-83.
"Comparison of synchronous HO proposals," 3GPP TSG RAN WG2 #59 R2-073183, IPWireless, NextWave Wireless, Jun. 20-24, 2007, pp. 1-7.
"Inter eNB handover in a synchronous network," 3GPP TSG RAN WG2#58 Tdoc R2-071978, Nortel, May 7-11, 2007.
"Non contention base methods in HO," 3GPP TSG-RAN WG2 Meeting #58bis R2-072389, Nokia Siemens Neworks, Nokia, Jun. 25-29, 2007.
"Synchronised Handover," 3GPP TSG-RAN WG2 Meeting #58 R2-071864, Nokia, NSN, May 7-11, 2007.
International Search Report issued in PCT/JP2010/062951, dated Sep. 14, 2010.

* cited by examiner

MOBILE STATION APPARATUS, BASE STATION APPARATUS, WIRELESS COMMUNICATION SYSTEM, AND WIRELESS COMMUNICATION METHOD

TECHNICAL FIELD

The present invention relates to a mobile station apparatus, a base station apparatus, a wireless communication system, and a wireless communication method.

BACKGROUND ART

In 3GPP (3rd Generation Partnership Project), a W-CDMA system is standardized as the third generation cellular mobile communication system, and service thereof has been started sequentially. In addition, HSDPA having a further improved communication speed is also standardized, and service thereof has been started.

Meanwhile, Evolved Universal Terrestrial Radio Access (hereinafter referred to as "EUTRA") has being standardized in 3GPP. As a downlink communication system of EUTRA, an OFDM (Orthogonal Frequency Division Multiplexing) system has been employed that has resistance to multipath interference and is suitable for high-speed transmission.

In addition, as an uplink communication system of EUTRA, has been employed a DFT (Discrete Fourier Transform)-spread OFDM system of SC-FDMA (Single Carrier-Frequency Division Multiple Access) that can reduce a PAPR (Peak to Average Power Ratio) of a transmission signal in consideration of cost and power consumption of mobile station apparatuses (MS1 to MS3).

As a downlink of EUTRA, the OFDM (Orthogonal Frequency Division Multiplexing) system has been proposed. In addition, as an uplink of EUTRA, a single-carrier communication system of the DFT (Discrete Fourier Transform)-spread OFDM system has been proposed.

The downlink of EUTRA is comprised of: a DPiCH (Downlink Pilot Channel); a DSCH (Downlink Synchronization Channel); a PDSCH (Physical Downlink Shared Channel); a PDCCH (Physical Downlink Control Channel); and a CCPCH (Common Control Physical Channel).

As shown in FIG. 16, the uplink of EUTRA is comprised of: a UPiCH (Uplink Pilot Channel); a RACH (Random Access Channel); a PUSCH (Physical Uplink Shared Channel); and a PUCCH (Physical Uplink Control Channel) (for example, refer to Non-Patent Document 1).

A configuration example of the uplink is shown in FIG. 17. One block is comprised of twelve subcarriers and seven OFDM symbols. Additionally, two blocks are used to be comprised in one resource block. The physical uplink shared channel PUSCH and the physical uplink control channel PUCCH are allocated to each mobile station apparatus by setting one resource block as a minimum unit. As for the random access channel RACH, one random access channel is prepared in one subframe and responds to access from a number of mobile station apparatuses. The above-described configuration of the random access channel RACH is informed to a mobile station apparatus as notifying information by a base station apparatus BS. The random access channel is arranged regularly, and the random access channel RACH, a region of the physical uplink shared channel PUSCH, and a region of the physical uplink control channel PUCCH are separated from each other as shown in FIG. 17. It is to be noted that the random access channel RACH is comprised of six resource blocks (for example, refer to Non-Patent Document 1).

The physical uplink shared channel PUSCH is utilized for data transmission of the mobile station apparatus. The physical uplink control channel PUCCH is used for transmission of a response (Ack/Nack) to the physical downlink shared channel PDSCH, a downlink CQI (Channel Quality Indicator), and an uplink wireless resource (physical uplink shared channel PUSCH) request (scheduling request). Positions of the physical uplink control channel PUCCH for transmitting the downlink CQI and the scheduling request are previously allocated to the mobile station apparatus establishing uplink synchronization with the base station apparatus, and the response to the physical downlink shared channel PDSCH is informed using scheduling information of the physical downlink shared channel PDSCH.

An object to use the random access channel is to synchronize between the mobile station apparatus and the base station apparatus in the uplink (adjust uplink transmission timing from the mobile station apparatus to the base station apparatus). A random access procedure includes two kinds of random access, i.e., Contention based Random Access as shown in FIG. 18 and Non-contention based Random Access as shown in FIG. 19. The Contention based Random Access is the random access in which collision may occur between the mobile station apparatuses, the Access being the usually performed one. The Non-contention based Random Access is the random access in which collision does not occur between the mobile station apparatuses, and which is performed by an instruction from the base station apparatus in a special case of handover etc. in order to quickly synchronize between the mobile station apparatus and the base station apparatus (for example, refer to Non-Patent Document 2).

When the mobile station apparatus accesses the random access channel RACH, it transmits only a random preamble. The random access preamble is comprised of a preamble portion and a CP (Cyclic prefix) portion. A CAZAC (Constant Amplitude Zero Auto-Correlation Zone Code) sequence, which is a signal pattern indicating information, is used for the preamble portion, and 6-bit information is represented by preparing sixty-four types of sequences.

A Contention based Random Access procedure will be described simply. First, a mobile station apparatus transmits a random access preamble to a base station apparatus (message 1: M1). Subsequently, the base station apparatus having received the random access preamble transmits a response to the random access preamble (random access response) to the mobile station apparatus (Message 2: M2). The mobile station apparatus transmits a message of upper layers (Layer2/Layer3) based on scheduling information included in the random access response (Message 3: M3). The base station apparatus transmits a collision confirmation message to the mobile station apparatus having been able to receive the M3, i.e., the message of the upper layers (message 4: M4).

Next, a Non-contention based Random Access procedure will be described simply. First, the base station apparatus informs the mobile station apparatus of a preamble number (or a sequence number) and a random access channel number to be used (message 0: N1). The mobile station apparatus transmits to the specified random access channel RACH a random access preamble of the specified preamble number (message 1: N2). Subsequently, the base station apparatus having received the random access preamble transmits a response to the random access preamble (random access response) to the mobile station apparatus (Message 2: N3).

The Contention based Random Access procedure will be described specifically. First, the mobile station apparatus selects a sequence group based on a downlink path loss or a size of the message 3. Next, one CAZAC sequence is randomly selected from the selected sequence group, and a random access preamble is generated based on the selected CAZAC sequence. Subsequently, the random access preamble is transmitted with the random access channel RACH (message 1 (M1)).

If the base station apparatus detects the random access preamble from the mobile station apparatus, it calculates an amount of transmission timing gap between the mobile station apparatus and the base station apparatus in accordance with the random access preamble. Subsequently, the base station apparatus performs scheduling (specifying a position of an uplink wireless resource, a transmission format (message size), etc.) in order to transmit an L2/L3 (Layer2/Layer3) message, and allocates Temporary C-RNTI (Cell-Radio Network Temporary Identity, i.e., mobile station apparatus identification information). Subsequently, the base station apparatus arranges in the physical downlink control channel PDCCH RA-RNTI (Random Access-Radio Network Temporary Identity) indicating the response to the mobile station apparatus that transmitted the random access preamble of the random access channel RACH (random access response). Subsequently, the base station apparatus transmits to the physical downlink shared data channel PDSCH a random access response message including: transmission timing gap information; scheduling information; and the Temporary C-RNTI and a preamble number (sequence number) of the received preamble (Message 2 (M2)). Note that a wireless resource allocated to the mobile station apparatus by the random access response is only for one resource block (one subframe).

If the mobile station apparatus detects that the physical downlink control channel PDCCH has the RA-RNTI, it confirms a content of the random access response message arranged in the physical downlink shared data channel PDSCH. If the preamble number corresponding to the transmitted random access preamble is included in the content as a result of confirmation, the mobile station apparatus extracts message information, corrects a transmission timing gap, and transmits the L2/L3 message including information that identifies the mobile station apparatus, such as C-RNTI (or Temporary C-RNTI) or IMSI (International Mobile Subscriber Identity), using a scheduled wireless resource and a transmission format (Message 3 (M3)). It is to be noted that the mobile station apparatus continues waiting for the random access response message from the base station apparatus for a certain period, and that the mobile station apparatus transmits the random access preamble again if it does not receive the random access response message including the preamble number of the transmitted random access preamble.

If the base station apparatus receives the L2/L3 message from the mobile station apparatus, it transmits to the mobile station apparatus a collision confirmation (contention resolution) message for determining whether or not collision has occurred between the mobile station apparatuses using the C-RNTI (or Temporary C-RNTI) or the IMSI included in the received L2/L3 message (message 4 (M4)). It is to be noted that the mobile station apparatus starts again from transmission of the random access preamble (message 1 (M1)) (for example, refer to Non-Patent Document 2), if it does not detect the random access response message including the preamble number corresponding to the random access preamble transmitted within the certain period, if it failed to transmit the message 3, or if it does not detect identification information of the mobile station apparatus itself in the collision confirmation message within the certain period. It is to be noted that control data for connection is further exchanged between the base station apparatus and the mobile station apparatus after the end of the random access procedure.

A handover procedure in an EUTRA system is shown in FIG. 20. The above-described random access procedure is utilized in the handover procedure. If data communication is performed between the mobile station apparatus and a base station apparatus 1, the mobile station apparatus transmits to the base station apparatus 1 a measurement report created by measuring a received quality of another base station apparatus. The base station apparatus 1 decides whether to execute handover based on the measurement report from the mobile station apparatus, and if it executes the handover, it decides a base station apparatus to which the handover is performed. Subsequently, the base station apparatus 1 transmits an HO Request message to a base station apparatus (base station apparatus 2) to which the handover is performed.

When the base station apparatus 2 receives the HO Request, it decides whether to permit the handover, and if it permits the handover, it transmits an HO Request Ack message to the base station apparatus 1. Information on the base station apparatus 2, information for performing random access, etc. are included in the HO Request Ack message. If the base station apparatus 1 receives the HO Request Ack message, it transmits to the mobile station apparatus an HO Command message including information included in the HO Request Ack.

If the mobile station apparatus receives the HO Command message, in order to execute the handover, it first performs synchronous processing for synchronizing with a downlink of the base station apparatus 2, and then, it performs random access with respect to the base station apparatus 2 based on the information on the random access included in the HO Command message. At this time, if a random access preamble number and a random access channel number to be used are included in the HO Command, the Non-contention based Random Access procedure is performed, and if not included, the Contention based Random Access procedure is executed.

The mobile station apparatus receives a random access response after transmitting the random access preamble, transmits a handover completion message to the base station apparatus 2 based on uplink wireless resource allocation information included in the random access response, and then the handover is completed. It is to be noted that a timer used in the handover is included in the HO Command, and that the mobile station apparatus repeats random access preamble transmission processing and random access response reception processing until the timer expires if it cannot receive the random access response from the base station apparatus 2. If the mobile station apparatus cannot receive the random access response even though the timer expires, it starts with retrieval of the base station apparatus deciding that the handover has failed.

In addition, discussion on Advanced-EUTRA, which is further evolved EUTRA, has also started in 3GPP. In Advanced-EUTRA, it is assumed that a band up to a 100 MHz bandwidth is used in the uplink and the downlink, respectively, and that communication is performed at a transmission rate not less than up to 1 Gbps in the downlink and up to 500 Mbps in the uplink.

Additionally, in Advanced-EUTRA, it is considered that the 100 MHz band is achieved by binding a plurality of 20 MHz bands of EUTRA so that the mobile station apparatus of EUTRA can also house the 100 MHz band (for example, refer to Non-Patent Document 3). It is to be noted that one 20 MHz band of EUTRA is called a component carrier (CC) in Advanced-EUTRA. FIGS. 21 and 22 are illustrations showing component carriers.

In addition, in Advanced-EUTRA, it is also considered that cooperative transmission, in which the same signal is transmitted at the same time and at the same frequency between adjacent base station apparatuses, is performed in order to increase a communication efficiency of the mobile station apparatus in a cell edge located far from the base station apparatus, and that a throughput of the mobile station apparatus near the cell edge is increased to thereby improve a throughput of the whole system.

CITATION LIST

Non-Patent Document

Non-Patent Document 1:3GPP TS (Technical Specification) 36.211, V8.60 (2009-03), Technical Specification Group Radio Access Network, Physical Channel and Mudulation (Release 8)

Non-Patent Document 2:3GPP TS (Technical Specification) 36.300, V8.80 (2009-03), Evolved Universal Terrestrial Radio Access (E-UTRA) and volved Universal Terrestrial Radio Access Network (E-UTRAN), Overall description Stage2

Non-Patent Document 3:3GPP TR (Technical Specification) 36.814, V0.41 (2009-02), Evolved Universal Terrestrial Radio Access (E-UTRA) Radio Resource Control (RRC) Protcol specification

DISCLOSURE OF THE INVENTION

Problem to be Solved by the Invention

A system of EUTRA is designed on the premise of an asynchronous system between the base station apparatuses. Therefore, a handover procedure in consideration of the asynchronous system is employed in order that the mobile station apparatus performs handover between the base station apparatuses. Namely, a random access procedure is executed at the time of execution of the handover.

However, in Advanced-EUTRA, when cooperative transmission etc. are performed in which the plurality of base station apparatuses are used with respect to one mobile station apparatus, communication may become in a synchronous state. Hence, there is a case where uplink synchronization is established between the plurality of base station apparatuses particularly with respect to the mobile station apparatus performing cooperative transmission (a case where adjustment of transmission timing from the mobile station apparatus to the base station apparatuses is not needed), and thus an efficiency may be poor when using a handover method on the assumption of the asynchronous system used in EUTRA.

The present invention is made in view of such situations, and an object of the present invention is to provide a mobile station apparatus, a base station apparatus, a wireless communication system, and a wireless communication method that can improve reliability of handover while efficiently early completing the handover.

Means for Solving the Problem (1) In order to achieve the above-described object, a mobile station apparatus of the present invention is the mobile station apparatus that switches a base station apparatus to communicate with by handover, the mobile station apparatus is characterized by: receiving an HO Command message including scheduled uplink transmission information from a base station apparatus of a handover source; performing uplink transmission to a base station apparatus of a handover destination based on the scheduled uplink transmission information; and executing a random access procedure to the base station apparatus of a handover destination if a response is not received from the base station apparatus of a handover destination with respect to a single time or plural times of the uplink transmission.

As described above, the mobile station apparatus establishing uplink synchronization can complete the handover early by performing uplink transmission based on the scheduled uplink transmission information. In addition, since the mobile station apparatus can perform random access again even if it failed to perform the uplink transmission, handover failure decreases and reliability of the handover improves.

(2) In addition, the mobile station apparatus of the present invention is characterized by: receiving an HO Command message including physical uplink control channel transmission information from the base station apparatus of a handover source; transmitting a control signal for a physical uplink control channel to the base station apparatus of a handover destination based on the physical uplink control channel transmission information; and executing a random access procedure to the base station apparatus of a handover destination if a response is not received from the base station apparatus with respect to a single time or plural times of transmission of the control signal to the physical uplink control channel.

As described above, the mobile station apparatus establishing uplink synchronization can complete the handover early by transmitting the control signal to the physical uplink control channel. In addition, since random access can be performed even if the synchronous handover has failed, reliability of the handover improves.

(3) In addition, the mobile station apparatus of the present invention is characterized by: receiving an HO Command message including physical uplink control channel allocation information and scheduling request transmission information of the base station apparatus of a handover destination from the base station apparatus of a handover source; transmitting a scheduling request to a physical uplink control channel allocated in accordance with the physical uplink control channel allocation information based on the physical uplink control channel allocation information and the scheduling request transmission information of the base station apparatus of a handover destination; and executing the random access procedure to the base station apparatus of a handover destination if a response is not received from the base station apparatus of a handover destination with respect to a single time or plural times of transmission of the scheduling request.

As described above, the mobile station apparatus establishing uplink synchronization can complete the handover early by transmitting the scheduling request. In addition, since the random access can be performed even if the synchronous handover has failed, reliability of the handover improves.

(4) In addition, the mobile station apparatus of the present invention is characterized by: receiving an HO Command message including the physical uplink control channel allocation information and downlink channel quality transmission information of the base station apparatus of a handover destination from the base station apparatus of a handover source; transmitting a downlink CQI to a physical uplink control channel allocated in accordance with the physical uplink control channel allocation information based on the physical uplink control channel allocation information and the downlink channel quality transmission information of the base station apparatus of a handover destination; and executing the random access procedure to the base station apparatus of a handover destination if a response is not received from the base station apparatus of a handover destination with respect to a single time or plural times of transmission of the downlink CQI.

As described above, the mobile station apparatus establishing uplink synchronization can complete the handover early by transmitting the downlink CQI. In addition, since the random access can be performed even if the synchronous handover has failed, reliability of the handover improves.

(5) In addition, the mobile station apparatus of the present invention is characterized by: receiving an HO Command message including reference signal transmission information from the base station apparatus of a handover source; transmitting a reference signal to the base station apparatus of a handover destination based on the reference signal transmission information; and executing the random access procedure to the base station apparatus of a handover destination if a response is not received from the base station apparatus of a handover destination with respect to a single time or plural times of transmission of the reference signal.

As described above, the mobile station apparatus establishing uplink synchronization can complete the handover early by transmitting the downlink reference signal. In addition, since the random access can be performed even if the synchronous handover has failed, reliability of the handover improves.

(6) In addition, the mobile station apparatus of the present invention is characterized by: receiving an HO Command message including physical uplink shared channel transmission information from the base station apparatus of a handover source; transmitting data to a physical uplink shared channel of the base station apparatus of a handover destination based on the physical uplink shared channel transmission information; and executing a random access procedure to the base station apparatus of a handover destination if a response is not received from the base station apparatus of a handover destination with respect to transmission of the data to the physical uplink shared channel by the number of retransmission of a hybrid ARQ specified in accordance with the physical uplink shared channel transmission information.

If the mobile station apparatus receives ACK with respect to transmission of a handover completion message utilizing the hybrid ARQ as described above, it can be determined that the handover has been completed. If the mobile station apparatus receives NACK or receives neither of the ACK/NACK, it retransmits the handover completion message based on hybrid ARQ retransmission information, and executes the random access if retransmission of the handover completion message exceeds the number of retransmission of the hybrid ARQ. As a result of this, since the random access can be performed even if the synchronous handover has failed, reliability of the handover improves.

(7) In addition, a mobile station apparatus of the present invention is the mobile station apparatus that switches a base station apparatus to communicate with by handover, the mobile station apparatus is characterized by: receiving an HO Command message including scheduled uplink transmission information from a base station apparatus of a handover source; performing uplink transmission to a base station apparatus of a handover destination based on the scheduled uplink transmission information; and performing uplink transmission to the base station apparatus of a handover source if a response is not received from the base station apparatus of a handover destination with respect to a single time or plural times of the uplink transmission.

As described above, the mobile station apparatus establishing uplink synchronization can complete the handover early by performing uplink transmission based on the scheduled uplink transmission information. In addition, since the mobile station apparatus again performs uplink transmission to the base station apparatus of a handover source even if it failed to perform the uplink transmission, handover failure decreases and reliability of the handover improves.

(8) In addition, the mobile station apparatus of the present invention is characterized by: receiving an HO Command message including physical uplink control channel allocation information and scheduling request transmission information of the base station apparatus of a handover destination from the base station apparatus of a handover source; transmitting a scheduling request to a physical uplink control channel allocated in accordance with the physical uplink control channel allocation information based on the physical uplink control channel allocation information and the scheduling request transmission information of the base station apparatus of a handover destination; and transmitting the scheduling request to the base station apparatus of a handover source if a response is not received from the base station apparatus of a handover destination with respect to a single time or plural times of transmission of the scheduling request.

As described above, the mobile station apparatus establishing uplink synchronization can complete the handover early since it transmits the scheduling request to the physical uplink control channel allocated based on the scheduling request transmission information. In addition, since the mobile station apparatus can perform a handover procedure to the base station apparatus of a handover source even if it failed to perform the uplink transmission, handover failure decreases and reliability of the handover improves.

Particularly in Advanced-EUTRA, when cooperative transmission etc. using the plurality of base station apparatuses are performed to one mobile station apparatus, communication may become in a synchronous state, thus enabling to perform efficient handover utilizing the synchronous state.

(9) In addition, the mobile station apparatus of the present invention is characterized by holding the physical uplink control channel allocation information and the scheduling request transmission information of the base station apparatus of a handover source until handover based on the received HO Command message is completed.

As a result of this, the mobile station apparatus can transmit the scheduling request to the allocated physical uplink control channel until the handover is completed, and thus the handover can be efficiently executed with high reliability.

(10) In addition, the mobile station apparatus of the present invention is characterized by: receiving an HO Command message including reference signal transmission information from the base station apparatus of a handover source; transmitting a reference signal to the base station apparatus of a handover destination based on the reference signal transmission information; and transmitting the reference signal to the base station apparatus of a handover source if a response from the base station apparatus of a handover destination is not received even though the reference signal is transmitted up to the specified number of times of transmission.

As described above, the mobile station apparatus establishing uplink synchronization can complete the handover early by transmitting the downlink reference signal. In addition, since the mobile station apparatus can perform a synchronous handover procedure to the base station apparatus of a handover source even if it failed to perform the synchronous handover, reliability of the handover improves.

(11) In addition, the mobile station apparatus of the present invention is characterized by holding the reference signal transmission information included in the HO Command message until handover based on the received HO Command message is completed. As a result of this, the mobile station apparatus can transmit the reference signal based on the reference signal transmission information held until the handover is completed, thus enabling to efficiently execute the handover with high reliability.

(12) In addition, the mobile station apparatus of the present invention is characterized by determining that the handover has failed if a timer included in the HO Command message expires during execution of the handover based on the received HO Command message. As a result of this, handover failure can be detected by managing the timer, and thus processing of establishing connection again can be started.

(13) In addition, a base station apparatus of the present invention is the base station apparatus that communicates with a mobile station apparatus that switches a communication destination by handover, the base station apparatus is characterized by: deciding execution of handover in accordance with a measurement report received from a mobile station apparatus in communication; and transmitting to the mobile station apparatus in communication an HO Command message including uplink transmission information to a base station apparatus of a handover destination and information on random access if the handover for which execution has been decided is synchronous handover.

As a result of this, the mobile station apparatus in communication performs uplink transmission to the base station apparatus of a handover destination based on the uplink transmission information provided from the base station apparatus, to thereby complete the handover early. In addition, since the mobile station apparatus can perform random access again even if it failed to perform the uplink transmission, handover failure decreases and reliability of the handover improves.

(14) In addition, a base station apparatus of the present invention is the base station apparatus that communicates with a mobile station apparatus that switches a communication destination by handover, the base station apparatus is characterized by: receiving decision of execution of handover from another base station apparatus; and transmitting as a base station apparatus of a handover destination an HO Command message including uplink transmission information to the own apparatus and information on random access to the mobile station apparatus that tries switching communication from the other base station apparatus if the handover for which execution has been decided is synchronous handover.

As a result of this, the mobile station apparatus that tries switching communication from the other base station apparatus performs uplink transmission to the base station apparatus of a handover destination based on the uplink transmission information provided from the base station apparatus to thereby complete the handover early. In addition, since the mobile station apparatus can perform random access again even if it failed to perform the uplink transmission, handover failure decreases and reliability of the handover improves.

(15) In addition, a wireless communication system of the present invention is the wireless communication system in which a mobile station apparatus switches a base station apparatus to communicate with by handover, the wireless communication system is characterized in that: a base station apparatus of a handover source decides execution of handover in accordance with a measurement report received from a mobile station apparatus in communication; the base station apparatus of a handover source or a base station apparatus of a handover destination resulting from execution of the handover decides whether to perform synchronous handover or asynchronous handover; the base station apparatus of a handover source or the base station apparatus of a handover destination transmits to the mobile station apparatus in communication an HO Command message including uplink transmission information to the base station apparatus of a handover destination and information on random access if it decides execution of the synchronous handover; the mobile station apparatus having received the HO Command message performs uplink transmission to the base station apparatus of a handover destination based on scheduled uplink transmission information included in the HO Command message; and that the mobile station apparatus executes a random access procedure to the base station apparatus of a handover destination if a response is not received from the base station apparatus of a handover destination with respect to the uplink transmission even though the mobile station apparatus performs the uplink transmission up to a predetermined number of times of transmission.

As a result of this, the mobile station apparatus establishing uplink synchronization can complete the handover early. In addition, since the mobile station apparatus can perform random access again even if it failed to perform the uplink transmission, handover failure decreases and reliability of the handover improves.

(16) In addition, a wireless communication system of the present invention is the wireless communication system in which a plurality of base station apparatuses perform handover to one mobile station apparatus using cooperative transmission, the wireless communication system is characterized in that: a base station apparatus of a handover source decides execution of handover in accordance with a measurement report received from a mobile station apparatus in communication; the base station apparatus of a handover source transmits to the mobile station apparatus in communication an HO Command message including uplink transmission information of a base station apparatus performing cooperative transmission; the mobile station apparatus having received the HO Command message performs uplink transmission to the base station apparatus of a handover destination based on scheduled uplink transmission information included in the HO Command message; and that the mobile station apparatus performs uplink transmission to another base station apparatus performing cooperative transmission if a response is not received from the base station apparatus of a handover destination with respect to the uplink transmission even though the mobile station apparatus performs the uplink transmission up to a predetermined number of times of transmission.

As a result of this, the mobile station apparatus establishing uplink synchronization can complete the handover early. In addition, since the mobile station apparatus again performs uplink transmission to the base station apparatus of a handover source even if it failed to perform the uplink transmission, handover failure decreases and reliability of the handover improves.

(17) In addition, a wireless communication method of the present invention is the wireless communication method in which a mobile station apparatus switches a base station apparatus to communicate with by handover, the wireless communication method is characterized in that: a base station apparatus of a handover source decides execution of handover in accordance with a measurement report received from a mobile station apparatus in communication; the base station apparatus of a handover source or a base station apparatus of a handover destination resulting from execution of the handover decides whether to perform synchronous handover or asynchronous handover; the base station apparatus of a handover source or the base station apparatus of a handover destination transmits to the mobile station apparatus in communication an HO Command message including uplink transmission information to the base station apparatus of a handover destination and information on random access if it decides execution of the synchronous handover; the mobile station apparatus having received the HO Command message performs uplink transmission to the base station apparatus of a handover destination based on scheduled uplink transmission information included in the HO Command message; and that the mobile station apparatus executes a random access procedure to the base station apparatus of a handover destination if a response from the base station apparatus of a handover destination is not received with respect to the uplink transmission even though the mobile station apparatus performs the uplink transmission up to a predetermined number of times of transmission.

As a result of this, the mobile station apparatus establishing uplink synchronization can complete the handover early. In addition, since the mobile station apparatus can perform random access again even if it failed to perform the uplink transmission, handover failure decreases and reliability of the handover improves.

(18) In addition, a wireless communication method of the present invention is the wireless communication method in which a plurality of base station apparatuses perform handover to one mobile station apparatus using cooperative transmission, the wireless communication method is characterized in that: a base station apparatus of a handover source decides execution of handover in accordance with a measurement report received from a mobile station apparatus in communication; the base station apparatus of a handover source transmits to the mobile station apparatus in communication an HO Command message including uplink transmission information of a base station apparatus performing cooperative transmission; the mobile station apparatus having received the HO Command message performs uplink transmission to the base station apparatus of a handover destination based on scheduled uplink transmission information included in the HO Command message; and that the mobile station apparatus performs uplink transmission to another base station apparatus performing cooperative transmission if a response from the base station apparatus of a handover destination is not received with respect to the uplink transmission even though the mobile station apparatus performs the uplink transmission up to a predetermined number of times of transmission.

As a result of this, the mobile station apparatus establishing uplink synchronization can complete the handover early. In addition, since the mobile station apparatus again performs uplink transmission to the base station apparatus of a handover source even if it failed to perform the uplink transmission, handover failure decreases and reliability of the handover improves.

Advantage of the Invention

According to the present invention, since handover can be completed early to the mobile station apparatus establishing uplink synchronization, and random access can be again performed even to the mobile station apparatus that has failed to perform uplink transmission, reliability of the handover improves.

BEST MODES FOR CARRYING OUT THE INVENTION

Hereinafter, embodiments of the present invention will be described with reference to drawings.

First Embodiment

Figure 1:
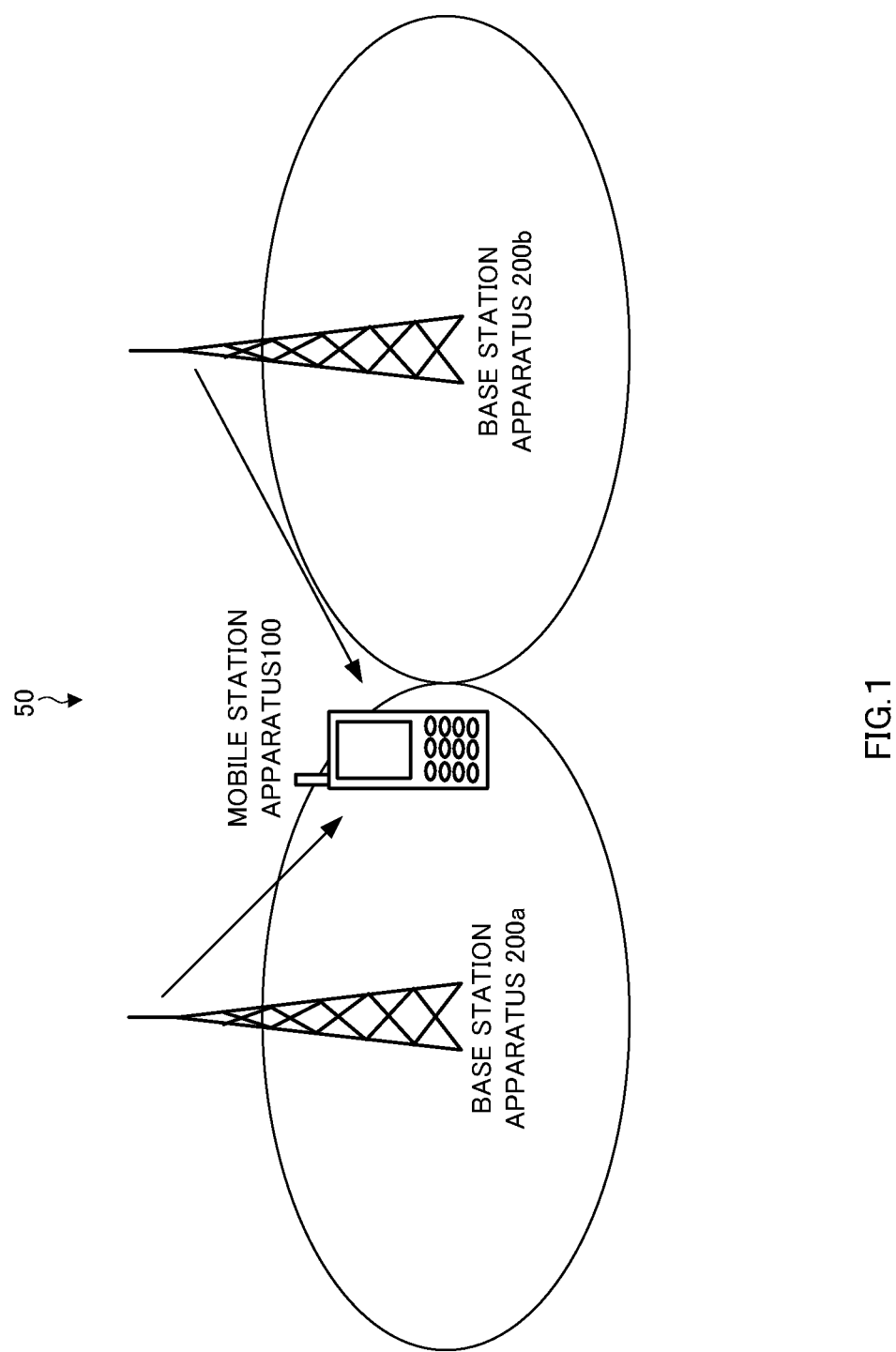
FIG. 1 is a schematic view showing a configuration of a wireless communication system of a first embodiment.

FIG. 1 is a schematic view showing one example of a wireless communication system 50. As shown in FIG. 1, the wireless communication system 50 comprises a mobile station apparatus 100 and base station apparatuses 200a and 200b. The base station apparatus 200a is the base station apparatus of a handover source in execution of handover, and the base station apparatus 200b is the base station apparatus of a handover destination in execution of the handover. It is to be noted that a base station apparatus 200 is the base station apparatus in a case where any one of the base station apparatus 200a and the base station apparatus 200b is not specified. In a case shown in FIG. 1, a handover procedure is performed from the base station apparatus of a handover source 200a to the base station apparatus of a handover destination 200b.

The wireless communication system 50 is the system that employs Advanced-EUTRA. In a system of EUTRA communication between the base station apparatuses 200a and 200b is designed on the premise of an asynchronous system. Therefore, when the mobile station apparatus 100 performs handover between the base station apparatuses 200a and 200b, a procedure is taken in consideration of the asynchronous system. Namely, the mobile station apparatus 100 must establish uplink synchronization with the base station apparatus 200b in order to start communication with the base station apparatus of a handover destination 200b (namely, the mobile station apparatus 100 must adjust transmission timing to the base station apparatus 200b) and therefore, needs to execute a random access procedure.

However, there is a case in Advanced-EUTRA where the plurality of base station apparatuses 200a and 200b have established uplink synchronization with the mobile station apparatus 100 performing cooperative transmission. In such a case, since a handover procedure using the random access procedure is performed even though the base station apparatuses 200a and 200b have established uplink synchronization, it takes time to perform handover processing due to an arrangement situation of a random access channel RACH of the base station apparatus, delay of the random access procedure, etc.

Consequently, as a first access to a base station apparatus of a handover destination of the mobile station apparatus 100 performing cooperative transmission etc. and establishing uplink synchronization (without needing to adjust transmission timing), uplink transmission other than random access is performed in a position specified by the base station apparatus 200a, and if a response to uplink transmission from the base station apparatus 200b is received, handover is completed. In uplink transmission other than the random access, included are a physical uplink control channel PUCCH, or a physical uplink shared channel PDSCH, and an uplink pilot channel UPiCH. Additionally, if a response is not received from the base station apparatus 200b with respect to the uplink transmission, the mobile station apparatus 100 is made to execute random access to the base station apparatus 200b. As a result of this, if the mobile station apparatus 100 receives a response, it can be connected early to the base station apparatus of a handover destination 200b. In addition, since the random access can be performed to the mobile station apparatus 100 that has failed to perform uplink transmission, reliability for handover processing is improved. It is to be noted that hereinafter, conventional handover is referred to as an asynchronous handover procedure, and that handover of the present invention is referred to as a synchronous handover procedure.

Figure 2:
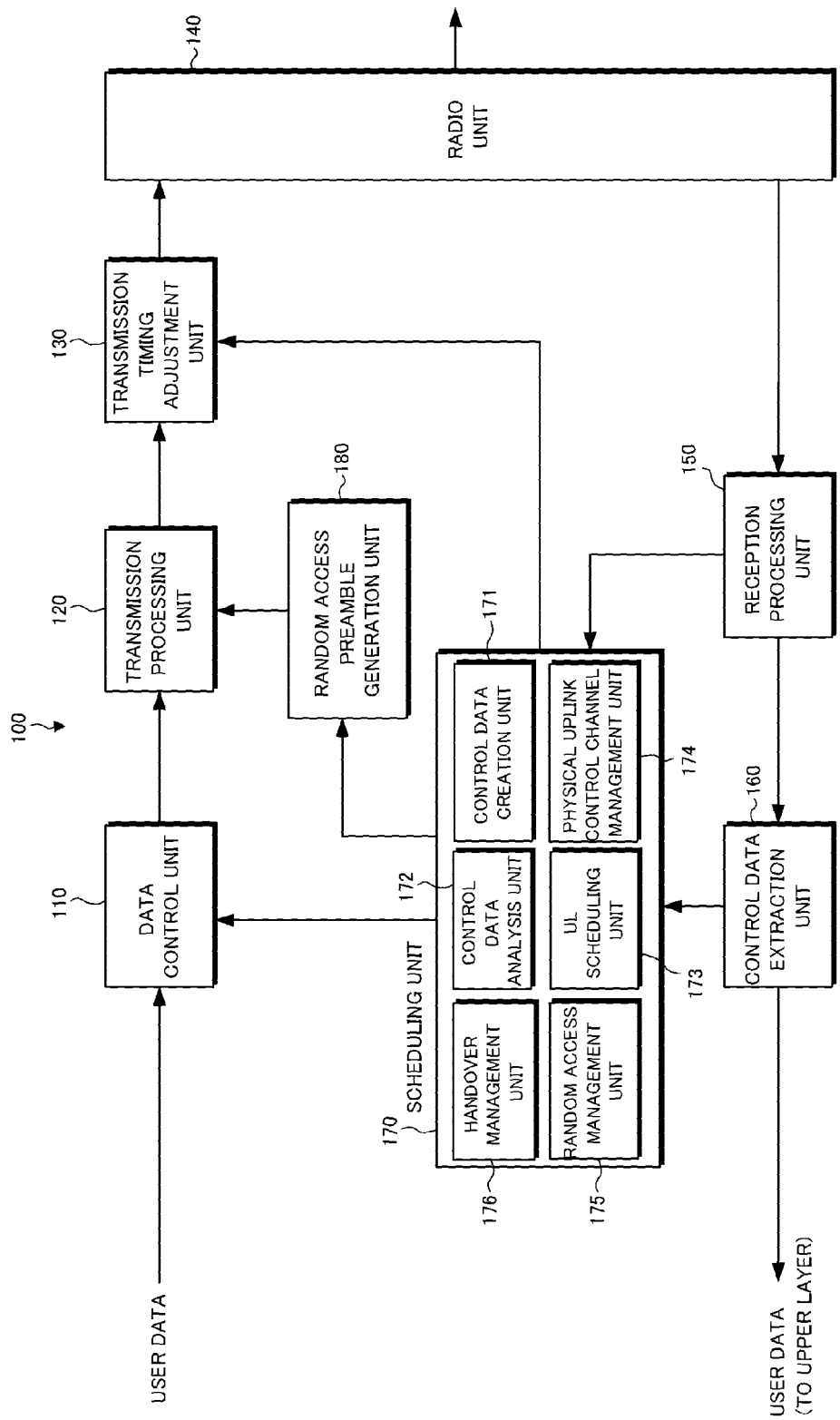
FIG. 2 is a block diagram showing a configuration of a mobile station apparatus of the first embodiment.

FIG. 2 is a block diagram showing a configuration of the mobile station apparatus 100. The mobile station apparatus 100 comprises: a data control unit 110; a transmission processing unit 120; a transmission timing adjustment unit 130; a wireless unit 140; a reception processing unit 150; a control data extraction unit 160; a scheduling unit 170; and a random access preamble generation unit 180.

User data from an upper layer and control data from the scheduling unit 170 are input into the data control unit 110. The data control unit 110 allocates each data to each channel in accordance with an instruction of the scheduling unit 170, and sends the data to the transmission processing unit 120. The transmission processing unit 120 encodes the data from the data control unit 110 and modulates it.

DFT (Discrete Fourier Transform) and IFFT (Inverse Fast Fourier Transform) processing are performed to a modulated signal, and a CP (Cyclic Prefix) is inserted into the signal. The transmission timing adjustment unit 130 adjusts transmission timing of data in accordance with transmission timing gap information passed from the scheduling unit 170. After the transmission timing of the data is adjusted, the data is up-converted into a radio frequency by the wireless unit 140 and is transmitted from a transmission antenna.

Meanwhile, the wireless unit 140 down-converts a wireless signal received from the antenna and passes it to the reception processing unit 150. The reception processing unit 150 performs FFT (Fast Fourier Transform) processing, decoding, demodulation processing, etc. to the signal passed from the wireless unit 140, and passes the demodulated data to the control data extraction unit 160. In addition, the reception processing unit 150 measures a downlink channel quality and passes a measurement result to the scheduling unit 170.

The control data extraction unit 160 determines whether or not the passed data is the data addressed to the mobile station apparatus itself in accordance with C-RNTI (mobile station apparatus identification information) arranged in the physical downlink control channel PDCCH, and separates into control data and user data the data of the physical downlink shared channel PDSCH demodulated by the reception processing unit 150 if the data is the one addressed to the mobile station apparatus itself. In addition, the control data extraction unit 160 detects a response (ACK/NACK) of the data transmitted with the physical uplink shared channel PUSCH. Subsequently, the control data extraction unit 160 passes the control data to the scheduling unit 170 and passes the user data to the upper layer. In addition, if the control data extraction unit 160 detects RA-RNTI (Random Access-Radio Network Temporary Identity) after transmitting a random access preamble, it passes a random access response message to the scheduling unit 170. In addition to the above, the control data extraction unit 160 instructs the scheduling unit 170 to return the response (ACK/NACK) to the received data.

The scheduling unit 170 comprises: a control data creation unit 171; a control data analysis unit 172; a UL scheduling unit 173: a physical uplink control channel management unit 174; a random access management unit 175; and a handover management unit 176.

The control data creation unit 171 creates control data, such as a measurement report message and a handover completion message. The control data analysis unit 172 analyzes control data, such as an HO Command message, a random access response, and a contention resolution from the control data extraction unit 160. Subsequently, the control data analysis unit 172 passes to the UL scheduling scheduling information (allocation information) of data transmitted with the physical uplink shared channel PUSCH, passes information on random access or information on a random access procedure to the random access management unit 175 and the random access preamble generation unit 180, and passes information on a scheduling request and position information of the physical uplink control channel PUCCH to the physical uplink control channel management unit 174. In addition, the control data analysis unit 172 passes to the handover management unit 176 a handover processing timer included in the HO Command message.

The UL scheduling unit 173 controls the data control unit 110 based on the scheduling information. The physical uplink control channel management unit 174 manages the physical uplink control channel PUCCH and generates the scheduling request. Subsequently, the physical uplink control channel management unit 174 creates a response (ACK/NACK) of the downlink data received by the control data extraction unit 160, and passes the response to the data control unit 110. In addition, if the physical uplink shared channel is allocated after the scheduling request is transmitted, the physical uplink control channel management unit 174 cancels transmitting the scheduling request, and if the physical uplink shared channel is not allocated even though the physical uplink control channel management unit 174 transmits the scheduling request up to the maximum number of times of transmission of the scheduling request, the physical uplink control channel management unit 174 instructs the random access management unit 175 to perform random access.

If the random access management unit 175 is instructed to perform random access, it selects a preamble number and a position of the random access channel RACH from the information on the random access. Subsequently, the random access management unit 175 informs the random access preamble generation unit 180 of the selected preamble number and position of the random access channel RACH. Subsequently, the random access management unit 175 confirms a content of the random access response passed from the control data analysis unit 172, and if it detects the transmitted preamble number of the random access preamble, it passes transmission timing gap information to the transmission timing adjustment unit 130. Subsequently, if the random access management unit 175 confirms the contention resolution message, it completes the random access.

At this time, the random access preamble generation unit 180 generates a random access preamble of a preamble number specified by the scheduling unit 170. Subsequently, the random access preamble generation unit 180 allocates the random access preamble to the specified position of the random access channel RACH and transmits it to the transmission processing unit 120.

The handover management unit 176 starts the timer when the handover processing timer is passed from the control data analysis unit 172, and if it finishes transmitting a handover completion message before the timer is expired, it stops the timer. If the timer is completed before the handover completion message is transmitted, the handover management unit 176 determines that the handover has failed, and cancels scheduling request transmission processing or the random access procedure.

Figure 3:
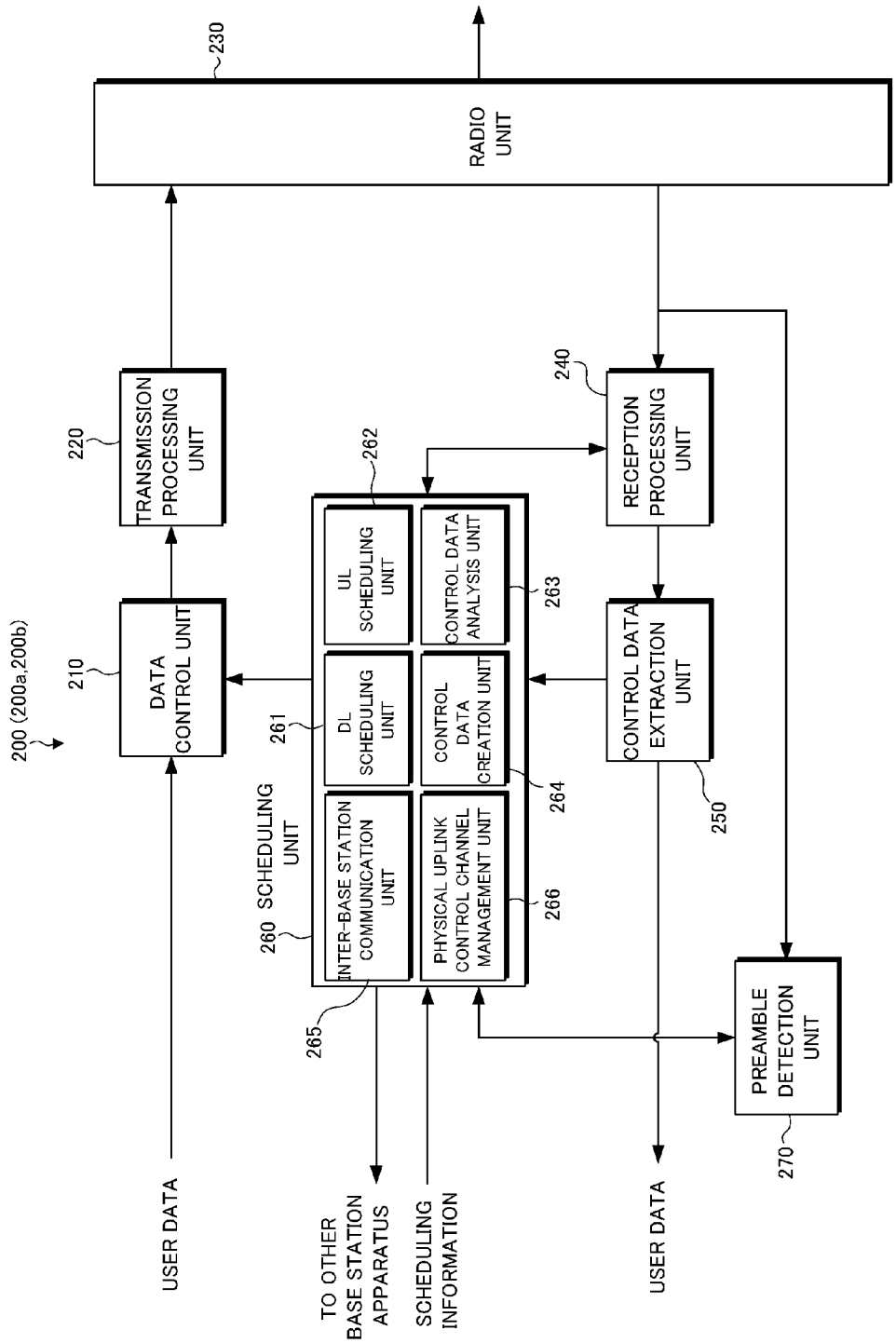
FIG. 3 is a block diagram showing a configuration of a base station apparatus of the first embodiment.

FIG. 3 is a block diagram showing a configuration of the base station apparatus 200. The base station apparatus 200 comprises: a data control unit 210; a transmission processing unit 220; a scheduling unit 260; a reception processing unit 240; a control data extraction unit 250; a preamble detection unit 270; and a wireless unit 230.

In accordance with an instruction from the scheduling unit 260, the data control unit 210 maps control data in the physical downlink control channel PDCCH, the downlink synchronization channel DSCH, the downlink pilot channel DPiCH, a common control physical signaling channel CCPCH, and the physical downlink shared channel PDSCH, and maps transmission data to each mobile station apparatus 100 in the physical downlink shared channel PDSCH.

The transmission processing unit 220 performs data modulation and series/parallel conversion of an input signal, and performs OFDM signal processing, such as IFFT (Inverse Fast Fourier Transform) conversion, CP (Cyclic Prefix) insertion, and filtering, to generate an OFDM signal. The wireless unit 230 up-converts the data modulated with OFDM into a radio frequency, and transmits it to the mobile station apparatus 100.

The wireless unit 230 receives uplink data from the mobile station apparatus 100, down-converts the data into a baseband signal, and passes the received data to the reception processing unit 240 and the preamble detection unit 270. The reception processing unit 240 performs demodulation processing in consideration of the transmission processing having performed by the mobile station apparatus 100 in accordance with uplink scheduling information of the scheduling unit 260, and demodulates the data. In addition, the reception processing unit 240 measures an uplink channel quality from the uplink pilot channel UPiCH, and passes a measurement result to the scheduling unit 260. It is to be noted that although an uplink communication system is assumed to be a single carrier system, such as DFT-spread OFDM, a multi carrier system such as the OFDM system may be used.

The control data extraction unit 250 confirms whether the received data is correct or incorrect and informs the scheduling unit 260 of a confirmation result. If the received data is correct, the control data extraction unit 250 separates the received data into user data and control data, and passes the control data to the scheduling unit 260 and passes the user data to the upper layer. In addition, the control data extraction unit 250 also passes to the scheduling unit 260 the scheduling request information of the physical uplink control channel PUCCH, the response (ACK/NACK) to the data of the physical downlink shared channel PDSCH, and the downlink CQI.

The scheduling unit 260 comprises: a DL scheduling unit 261; a UL scheduling unit 262; a control data analysis unit 263; a control data creation unit 264; an inter-base station communication unit 265; and a physical uplink control channel management unit 266.

The DL scheduling unit 261 performs scheduling of a downlink. The DL scheduling unit 261 performs scheduling for mapping the user data and the control data in each downlink channel in accordance with the downlink CQI informed by the mobile station apparatus 100, each user's data information informed by the upper layer, and control data created by the control data creation unit 264.

The UL scheduling unit 262 performs scheduling of an uplink. The UL scheduling unit 262 performs scheduling (allocation of a resource block and decision of a modulation/encoding system of the data) for mapping the user data in the physical uplink shared channel PUSCH based on an uplink channel quality measurement result from the reception processing unit 240 and the scheduling request from the mobile station apparatus 100, and passes a scheduling result to the control data creation unit 264 and the reception processing unit 240. In addition, if the preamble detection unit 270 informs the UL scheduling unit 262 of detection of the random access preamble, the UL scheduling unit 262 allocates the physical uplink shared channel PUSCH and informs the control data creation unit 264 of scheduling information.

The control data analysis unit 263 analyzes the control data of the measurement report message and the handover completion message from the mobile station apparatus 100. Subsequently, if the control data analysis unit 263 decides handover from the measurement report, it selects the base station apparatus of a handover destination 200*b*, and instructs the inter-base station communication unit 265 to perform an HO Request to the selected base station apparatus 200. Subsequently, the control data analysis unit 263 instructs the DL scheduling unit 261 and the UL scheduling unit 262 to start data scheduling and transmission/reception of the data with respect to the mobile station apparatus 100 having completed the handover.

The control data creation unit 264 creates control data and passes the created control data to the data control unit 210. In the control data included are: a control message including uplink or downlink scheduling information (allocation information); a response (ACK/NACK) of data transmitted with the physical uplink shared channel PUSCH; an HO Command message including allocation information of the physical uplink control channel PUCCH, signal generation information, or information on random access; and a random access response message and a contention resolution message, etc. including a preamble number, transmission timing gap information, and scheduling information.

If the inter-base station communication unit 265 is instructed to perform the HO Request, it creates an HO Request message and transmits the HO Request message to the base station apparatus 200b to which handover is requested. If the inter-base station communication unit 265 receives an HO Request Ack message from the base station apparatus of a handover destination 200b, it instructs the control data creation unit 264 to create an HO Command message.

The physical uplink control channel management unit 266 allocates to the mobile station apparatus 100 the physical uplink control channels PUCCH for the scheduling request, for the response of the physical downlink shared channel PDSCH, and for transmission of the downlink CQI, respectively. Subsequently, the physical uplink control channel management unit 266 passes the allocation information and generation information of a signal for each application to the control data creation unit 264. In addition, the physical uplink control channel management unit 266 releases allocation of the each physical uplink control channel PUCCH allocated to the mobile station apparatus 100 that performs handover after the HO Command message is transmitted.

If the preamble detection unit 270 detects the random access preamble in the random access channel RACH, it calculates an amount of transmission timing gap. Subsequently, the preamble detection unit 270 reports the detected preamble number and amount of transmission timing gap to the scheduling unit 260.

Figure 4:
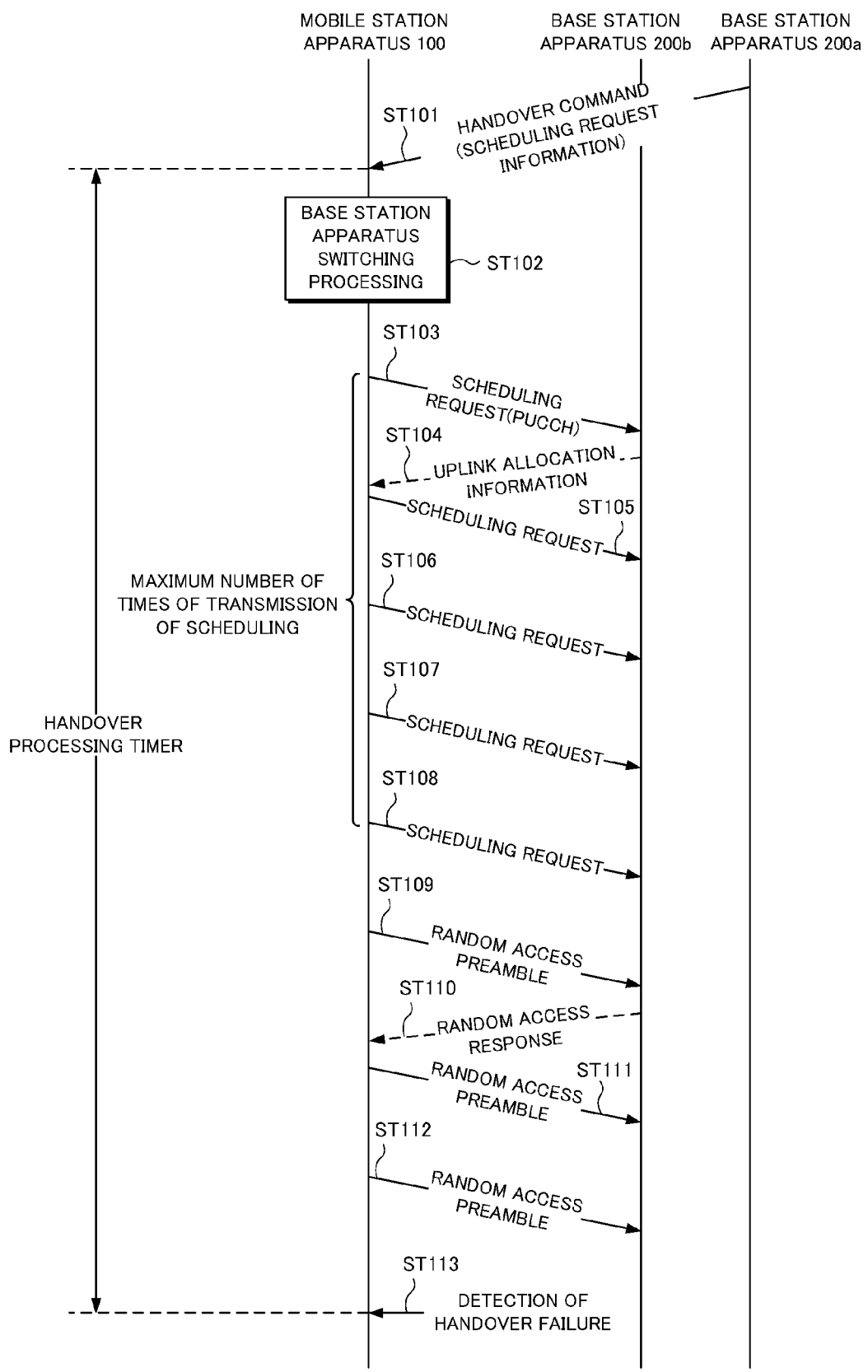
FIG. 4 is a sequence chart showing an operation example of handover.

FIG. 4 is a sequence chart showing an operation example of handover. FIG. 4 shows a summary of a synchronous handover procedure when scheduling request transmission of the physical uplink control channel PUCCH is used.

The base station apparatus of a handover source 200a informs the mobile station apparatus 100 using the HO Command message of information on the base station apparatus of a handover destination 200b, position information of the physical uplink control channel PUCCH of the base station apparatus of a handover destination 200b, information on the scheduling request, information on the random access, C-RNTI, and the handover processing timer (step ST101).

The information on the base station apparatus of a handover destination 200b is the common information to the mobile station apparatus 100 in the base station apparatus 200, and is the information specific to the base station apparatus. For example, base station apparatus identification information etc. are included in the information on the base station apparatus of a handover destination 200b. The information on the scheduling request includes information on scheduling request generation and the maximum number of times of transmission of the scheduling request. In addition, the information on the random access includes the position of the random access channel RACH, random access preamble generation information, etc. In addition, the C-RNTI is identification information of the mobile station apparatus 100.

If the mobile station apparatus 100 receives the HO Command message, it switches a setting of the communication destination from a setting of the base station apparatus of a handover source 200a to a setting of the base station apparatus of a handover destination 200b based on the information of the HO Command message (step ST102). Subsequently, the mobile station apparatus 100 generates a scheduling request and transmits the scheduling request in an allocated physical uplink control channel PUCCH (step ST103). If the mobile station apparatus 100 receives allocation information (scheduling information) of the physical uplink shared channel PUSCH, which is a response to the scheduling request, from the base station apparatus of a handover destination 200b, it transmits a handover completion message to an allocated physical uplink shared channel PUSCH. If the mobile station apparatus 100 does not receive the allocation information (step ST104), it transmits the scheduling request again with the allocated physical uplink control channel PUCCH (step ST105). Note that the handover completion message may be information on a transmission buffer of the mobile station apparatus.

If the mobile station apparatus 100 cannot receive the allocation information from the base station apparatus of a handover destination 200b even though it transmits the scheduling request up to the maximum number of times of transmission of the scheduling request specified by the HO Command (steps ST106 to ST108), it executes the random access procedure. Namely, the mobile station apparatus 100 generates a random access preamble using the information on the random access informed by the HO Command, and transmits the random access preamble to the random access channel RACH of the base station apparatus of a handover destination 200b (step ST109). Subsequently, if the mobile station apparatus 100 receives a random access response to the transmitted random access preamble, it transmits the handover completion message to the allocated physical uplink shared channel PUSCH based on the allocation information of the physical uplink shared channel PUSCH included in the random access response.

If the mobile station apparatus 100 cannot receive the random access response to the transmitted random access preamble (step ST110), it continues to transmit the random access preamble again (steps ST111 and ST112). If the mobile station apparatus 100 does not complete the random access processing even though the handover processing timer expires, it determines that the handover has failed (step ST113). It is to be noted that although any of the contention based random access or the non-contention based random access may be used as the random access procedure, the base station apparatus 200a specifies a preamble number and a position of the random access channel that are used in the HO Command message if the non-contention based random access is executed.

Figure 5:
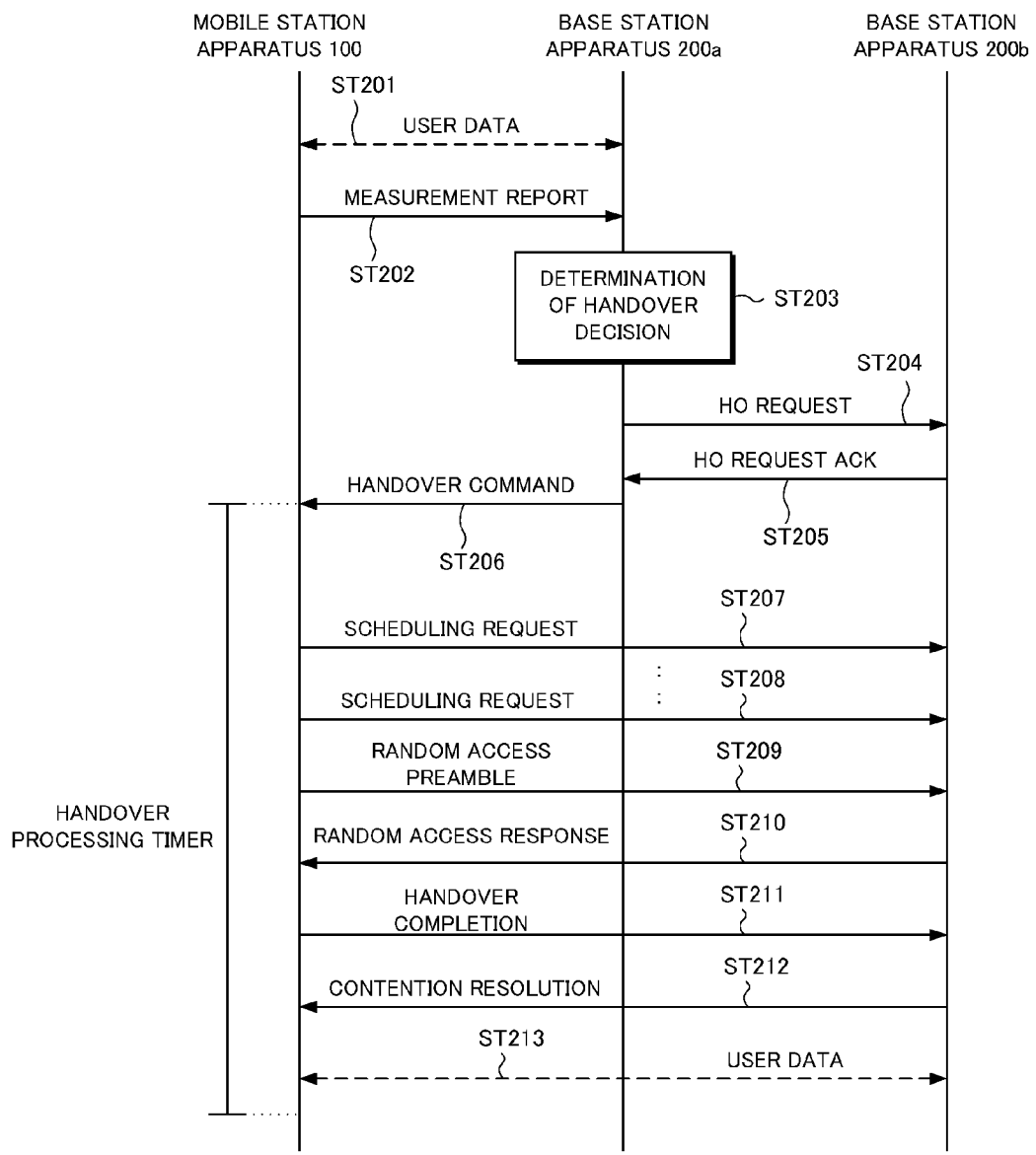
FIG. 5 is a sequence chart showing an operation example of handover.

Next will be described details of a synchronous handover procedure when scheduling request transmission of the physical uplink control channel PUCCH is used. FIG. 5 is a sequence chart showing an operation example of handover.

As shown in FIG. 5, it is assumed that the mobile station apparatus 100 transmits/receives user data to/from the base station apparatus 200a (step ST201). Next, the mobile station apparatus 100 measures a channel quality of another base station apparatus 200 in accordance with an instruction from the base station apparatus 200a. Subsequently, the mobile station apparatus 100 transmits a measurement report message including a measurement result to the base station apparatus 200a (step ST202). The base station apparatus 200a determines whether to make the mobile station apparatus 100 perform handover based on the measurement report from the mobile station apparatus 100 (step ST203). If the base station apparatus 200a decides to make the mobile station apparatus 100 perform handover to the base station apparatus 200b, it transmits an HO Request message to the base station apparatus 200b (step ST204). At this time, if it is assumed that the base station apparatuses 200a and 200b perform cooperative transmission etc. to the mobile station apparatus 100, and that uplink synchronization is established between the base station apparatus 200b and the mobile station apparatus 100, the base station apparatus 200a also includes a synchronous handover request in the HO Request message. If the base station apparatus 200b receives the HO Request message, it determines whether to be able to house the mobile station apparatus 100.

If the base station apparatus 200b can house the mobile station apparatus 100 and is requested to perform synchronous handover by the base station apparatus 200a, it transmits to the base station apparatus 200a an HO Request Ack message including information on the base station apparatus 200b, position information of the physical uplink control channel PUCCH of the base station apparatus 200b, information on a scheduling request, information on random access, C-RNTI, and a handover processing timer (step ST205).

It is to be noted that the information on the base station apparatus 200b includes base station apparatus identification information etc. The position information of the physical uplink control channel PUCCH of the base station apparatus 200b includes range information of the physical uplink control channel PUCCH and allocation information to the mobile station apparatus 100 for transmitting the scheduling request. In addition, the information on the scheduling request includes information on scheduling request generation and the maximum number of times of transmission of the scheduling request. The information on the random access includes a position of the random access channel RACH, random access preamble generation information, etc. In addition, the C-RNTI is identification information of the mobile station apparatus 100.

In addition, in a case of asynchronous handover, the base station apparatus 200b transmits to the base station apparatus 200a an HO Request Ack message including information on the base station apparatus 200b, information on random access, C-RNTI, and a handover processing timer. It is to be noted that the information on the base station apparatus 200b includes the base station apparatus identification information etc., and that the information on the random access includes the position of the random access channel RACH, random access preamble generation information, etc. In addition, the C-RNTI is identification information of the mobile station apparatus 100.

It is to be noted that the base station apparatus of a handover destination 200b may determine to make the mobile station apparatus 100 execute either of the synchronous handover or the asynchronous handover. Since the base station apparatus of a handover destination 200b can monitor an uplink signal of the mobile station apparatus 100, it can previously determine whether or not there is a gap in transmission timing of the mobile station apparatus 100.

If the base station apparatus 200a receives the HO Request Ack message from the base station apparatus 200b, it transmits to the mobile station apparatus 100 an HO Command message including a content of the HO Request Ack message (step ST206).

If the mobile station apparatus 100 receives the HO Command message, it switches a setting of the communication destination from a setting of the base station apparatus 200a to a setting of the base station apparatus 200b based on the information of the HO Command message. Subsequently, if the synchronous handover is instructed by the HO Command message, the mobile station apparatus 100 generates a scheduling request from the information on the scheduling request included in the HO Command, and transmits the scheduling request to the base station apparatus 200b with an allocated physical uplink control channel PUCCH (step ST207). The mobile station apparatus 100 monitors the physical downlink control channel PDCCH, and if it receives allocation information of the physical uplink shared channel PUSCH, which is a response to the scheduling request, from the base station apparatus 200b, it transmits a handover completion message to an allocated physical uplink shared channel PUSCH.

If the mobile station apparatus 100 does not receive the allocation information, it transmits the scheduling request again to the base station apparatus 200b with the allocated physical uplink control channel PUCCH (step ST208). If the mobile station apparatus 100 does not receive the allocation information from the base station apparatus 200b even though it transmits the scheduling request up to the maximum number of times of transmission of the scheduling request specified by the HO Command message, it executes random access. Here, a case will be described where the mobile station apparatus 100 executes contention based random access.

The mobile station apparatus 100 generates a random access preamble using the information on the random access informed by the HO Command message, and transmits the random access preamble to the random access channel RACH of the base station apparatus 200b (step ST209). Subsequently, if the mobile station apparatus 100 receives a random access response to the random access preamble transmitted from the base station apparatus 200b (step ST210), it changes transmission timing utilizing transmission timing gap information included in the random access response. Subsequently, the mobile station apparatus 100 transmits to the allocated physical uplink shared channel PUSCH a handover completion message including C-RNTI included in the HO Command based on allocation information of the physical uplink shared channel PUSCH included in the random access response (step ST211).

Subsequently, if the mobile station apparatus 100 receives a contention resolution message from the base station apparatus 200b (step ST212), it determines that the handover is completed. Subsequently, the mobile station apparatus 100 and the base station apparatus 200b transmit/receive user data (step ST213). If the mobile station apparatus 100 cannot receive the random access response to the transmitted random access preamble, it continues to transmit the random access preamble again. Subsequently, if the mobile station apparatus 100 does not complete random access processing even though the handover processing timer expires, it determines that the handover has failed.

It is to be noted that a position to be allocated at this time of the physical uplink control channel PUCCH for the scheduling request is allocated at an interval as short as possible. The mobile station apparatus 100 can be early connected to the base station apparatus of a handover destination 200b using few wireless resources by performing as described above, and additionally, random access can be performed also to the mobile station apparatus 100 with an uncertain uplink synchronization or the mobile station apparatus 100 with a rapidly changed channel quality, thus resulting in the improved reliability for handover processing.

In addition, although scheduling transmission of the physical uplink control channel PUCCH is described in this example, a case is similar to this example where transmission of a downlink CQI of the physical uplink control channel PUCCH is utilized. In that case, the base station apparatus 200 allocates the physical uplink control channel PUCCH for transmission of the downlink CQI instead of the physical uplink control channel PUCCH allocated for the scheduling request. The mobile station apparatus 100 transmits the downlink CQI with an allocated physical uplink control channel PUCCH. Subsequently, if data of the physical downlink shared channel PDSCH is allocated from the base station apparatus 200, and the mobile station apparatus 100 receives the data of the physical downlink shared channel PDSCH or transmits a response (ACK/NACK) of the received data, it determines that the handover is completed.

Meanwhile, if downlink data is not allocated to the mobile station apparatus 100 even though the mobile station apparatus 100 transmits the downlink CQI up to the certain number of times, it executes random access processing. If handover processing is not successfully performed even though the handover processing timer expires in the random access processing, the mobile station apparatus 100 determines that the handover has failed.

Figure 6:
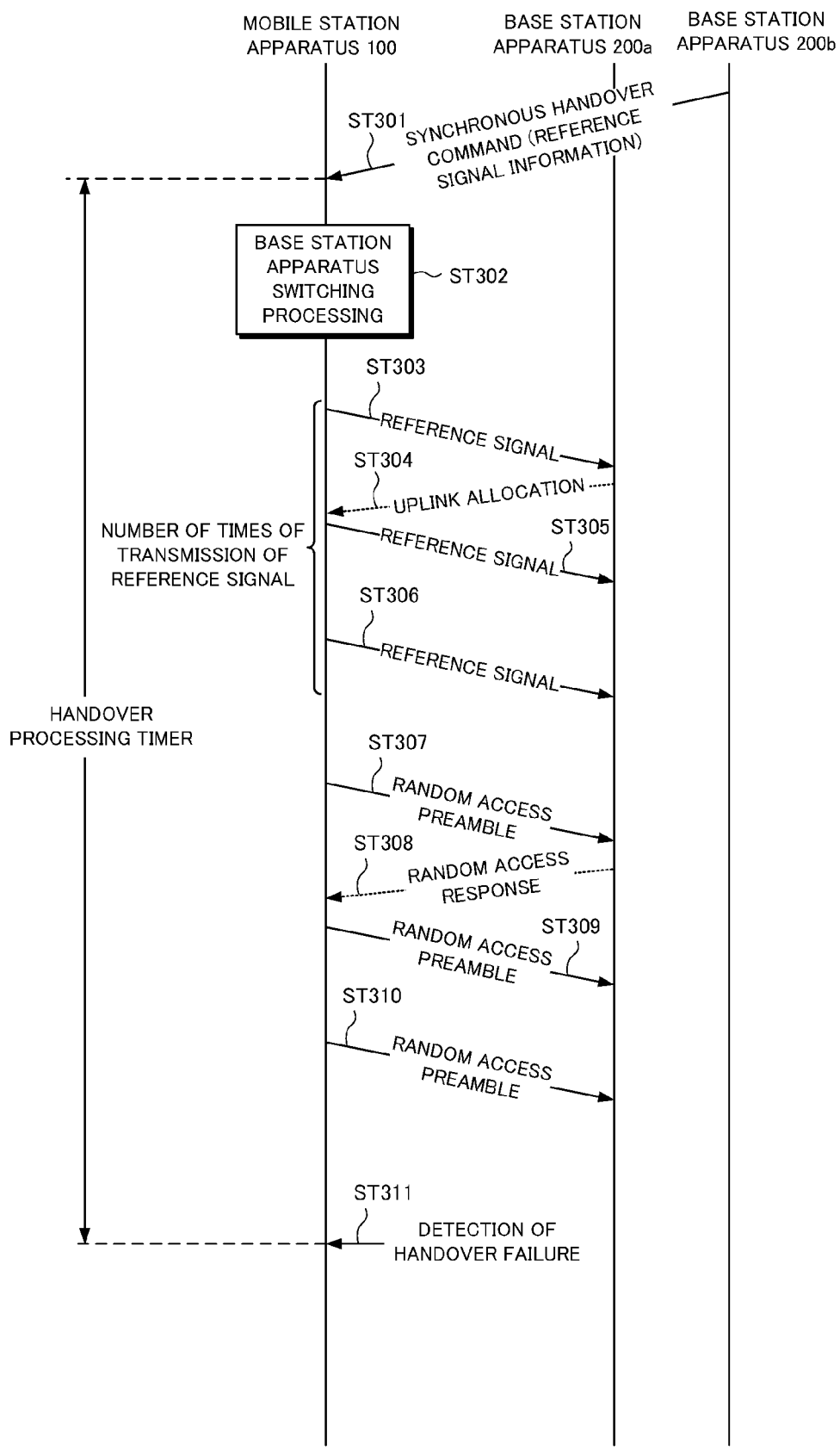
FIG. 6 is a sequence chart showing an operation example of handover.

FIG. 6 is a sequence chart showing an operation example of handover. FIG. 6 shows a summary of one example of a handover procedure when an uplink pilot channel UPiCH is used. The uplink pilot channel UPiCH includes two kinds of reference signals, i.e., a demodulation reference signal for demodulating the physical uplink shared channel PUSCH and a measurement reference signal for measuring the uplink channel quality. Here, an example will be described where the measurement reference signal is used.

First, the base station apparatus of a handover source 200a informs the mobile station apparatus 100 using an HO Command message of information on the base station apparatus of a handover destination 200b, setting information on a measurement reference signal of the base station apparatus of a handover destination 200b, information on random access, and C-RNTI, and a handover processing timer (step ST301). If the mobile station apparatus 100 receives the HO Command message, it switches a setting of the communication destination from a setting of the base station apparatus of a handover source 200a to a setting of the base station apparatus of a handover destination 200b based on the information of the HO Command message (step ST302). Subsequently, the mobile station apparatus 100 generates a measurement reference signal and transmits the reference signal in an allocated transmission position (step ST303).

Setting information on the measurement reference signal of the base station apparatus of a handover destination 200b includes: information for generating the measurement reference signal; information on a transmission position/a transmission period of the measurement reference signal; information on a transmission band of the measurement reference signal; and information on the number of times of transmission of the measurement reference signal, etc. The information on the random access includes a position of the random access channel RACH and random access preamble generation information, etc. The C-RNTI is mobile station apparatus identification information.

If the mobile station apparatus 100 receives allocation information of the physical uplink shared channel PUSCH, which is a response to the reference signal, from the base station apparatus of a handover destination 200b (step ST304), it transmits a handover completion message to an allocated physical uplink shared channel PUSCH. If the mobile station apparatus 100 does not receive the allocation information, it transmits the measurement reference signal again in the allocated transmission position (steps ST305 to ST306). If the mobile station apparatus 100 cannot receive the allocation information from the base station apparatus of a handover destination 200b even though it transmits the measurement reference up to the number of times of transmission of the measurement reference signal specified by the HO Command, it executes random access procedure. Namely, the mobile station apparatus 100 generates a random access preamble using the information on the random access informed by the HO Command, transmits the random access preamble to the random access channel RACH of the base station apparatus of a handover destination 200b (step ST307). Subsequently, if the mobile station apparatus 100 receives a random access response to the transmitted random access preamble, it transmits the handover completion message to the allocated physical uplink shared channel PUSCH based on the allocation information of the physical uplink shared channel PUSCH included in the random access response (step ST308).

If the mobile station apparatus 100 cannot receive the random access response to the transmitted random access preamble, it continues to transmit the random access preamble again (steps ST309 to ST310). Subsequently, if the mobile station apparatus 100 does not complete the random access processing even though the handover processing timer expires, it determines that the handover has failed (step ST311). It is to be noted that although any of the contention based random access or the non-contention based random access may be used as the random access procedure, the base station apparatus 200 specifies a preamble number and a position of the random access channel that are used in the HO Command message if the non-contention based random access is executed.

Figure 7:
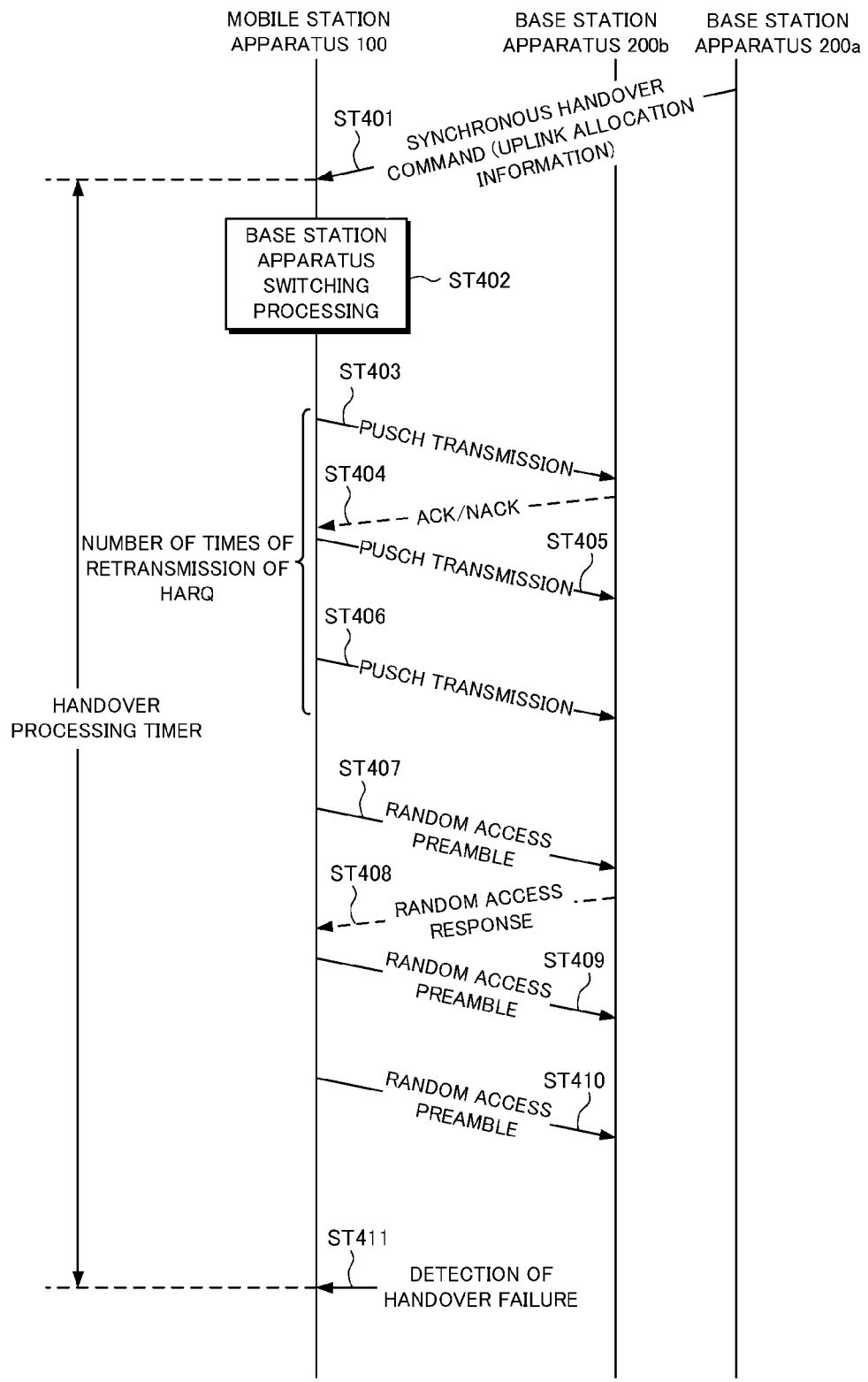
FIG. 7 is a sequence chart showing an operation example of handover.

FIG. 7 is a sequence chart showing an operation example of handover. FIG. 7 shows a summary of one example of a handover procedure when a physical uplink shared channel PUSCH is used.

The base station apparatus of a handover source 200a informs the mobile station apparatus 100 using an HO Command message of information on the base station apparatus of a handover destination 200b, allocation information of the physical uplink shared channel PUSCH in the base station apparatus of a handover destination 200b, information on random access, and C-RNTI, and a handover processing timer (step ST401). If the mobile station apparatus 100 receives the HO Command message, it switches a setting of the communication destination from a setting of the base station apparatus of a handover source 200a to a setting of the base station apparatus of a handover destination 200b based on the information of the HO Command message (step ST402).

The allocation information of the physical uplink shared channel PUSCH includes: information on a time/frequency position; modulation/encoding system of transmission data; retransmission information and the number of retransmission information of a HARQ (Hybrid Automatic Repeat Request); and generation information of a demodulation reference signal. The information on the random access includes a position of the random access channel RACH, random access preamble generation information, etc. The C-RNTI is mobile station apparatus identification information.

Subsequently, the mobile station apparatus 100 creates a handover completion message, and transmits the handover completion message with an allocated physical uplink shared channel PUSCH (step ST403). If the mobile station apparatus 100 receives ACK (Acknowledgement) to the handover completion message from the base station apparatus of a handover destination 200b, it determines that the handover is completed. If the mobile station apparatus 100 receives NACK (Negative Acknowledgement) or receives neither of the ACK/NACK (step ST404), it retransmits the handover completion message again based on HARQ retransmission information (steps ST405 to ST406).

If the mobile station apparatus 100 cannot receive the ACK even though it transmits the handover completion message with the physical uplink shared channel PUSCH up to the number of retransmission, it executes random access procedure. Namely, the mobile station apparatus 100 generates a random access preamble using the information on the random access informed by the HO Command, transmits the random access preamble to the random access channel RACH of the base station apparatus of a handover destination 200b (step ST407). Subsequently, if the mobile station apparatus 100 receives the random access response to the transmitted random access preamble, it transmits the handover completion message to the allocated physical uplink shared channel PUSCH based on allocation information of the physical uplink shared channel PUSCH included in the random access response.

If the mobile station apparatus 100 cannot receive the random access response to the transmitted random access preamble (step ST408), it continues to transmit the random access preamble again (steps ST409 to ST410). Subsequently, if the mobile station apparatus 100 does not complete the random access processing even though the handover processing timer expires, it determines that the handover has failed (step ST411). It is to be noted that although any of the contention based random access or the non-contention based random access may be used as the random access procedure, the base station apparatus 200 specifies a preamble number and a position of the random access channel that are used in the HO Command message if the non-contention based random access is executed.

Uplink transmission is first performed at a scheduled position other than the random access as described above, and thereby handover can be completed early. In addition, since the mobile station apparatus 100 can perform the random access procedure even if it failed to perform the uplink transmission, it is unlikely to cause handover failure.

It is to be noted that the mobile station apparatus 100 may determine which method is used for performing handover, the synchronous handover method of the present invention, or the asynchronous handover method by presence/absence of the scheduling request, the reference signal, or the allocation information of the physical uplink shared channel PUSCH. In addition, the mobile station apparatus 100 may indicate which handover procedure is used using 1 bit of flag information in the handover message. The mobile station apparatus 100 may execute the synchronous handover by recognizing that the base station apparatus 200 is performing cooperative transmission, Second Embodiment Although the mobile station apparatus 100 first performs uplink transmission, and performs random access if it failed to perform the uplink transmission in the handover procedure of the first embodiment, it may restore the communication destination to the source base station apparatus 400a if it failed to perform the uplink transmission.

Figure 8:
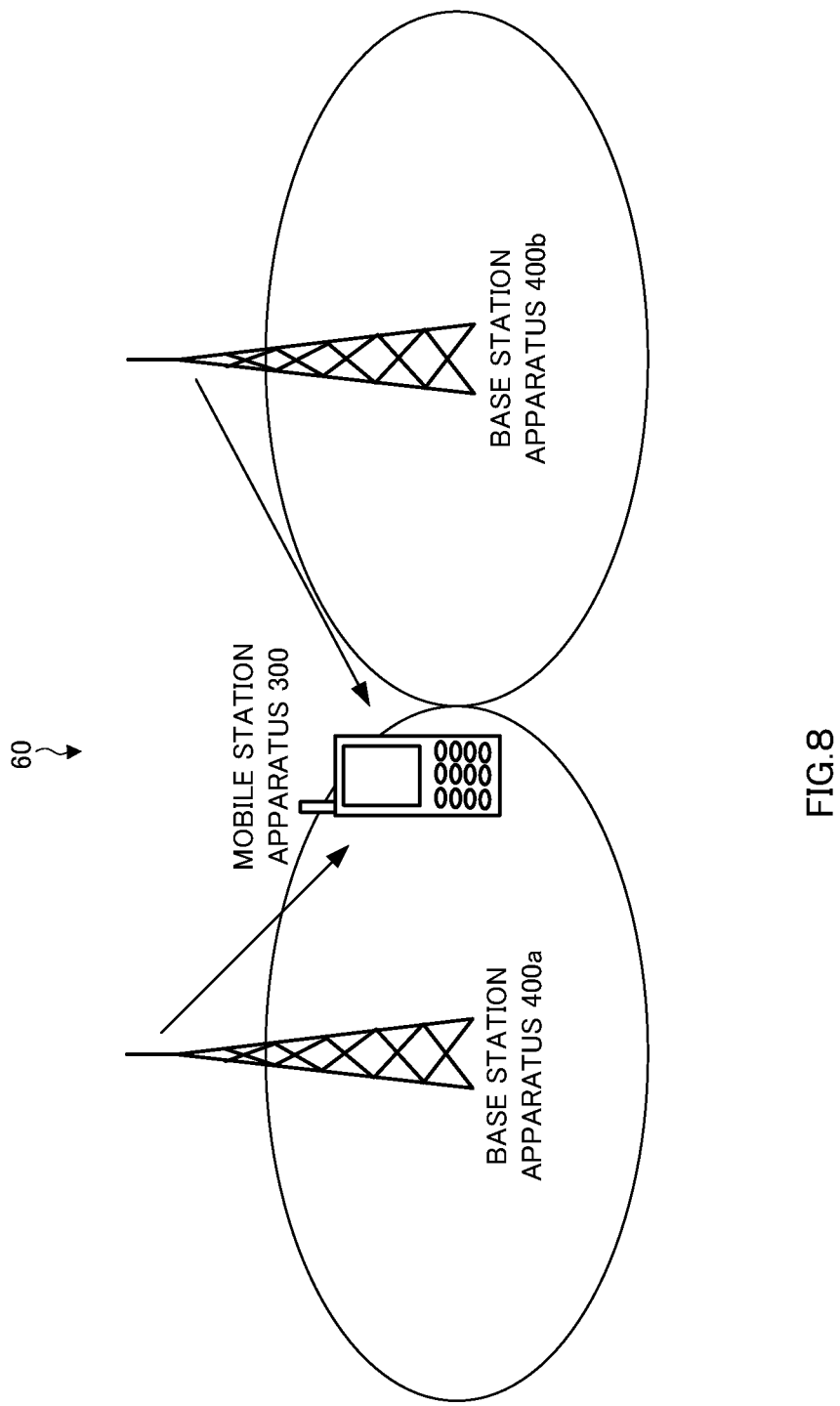
FIG. 8 is a schematic view showing a configuration of a wireless communication system of a second embodiment.

FIG. 8 is a schematic view showing one example of a wireless communication system 60. As shown in FIG. 8, the wireless communication system 60 comprises a mobile station apparatus 300 and base station apparatuses 400a and 400b. The base station apparatus 400a is the base station apparatus of a handover source, and the base station apparatus 400b is the base station apparatus of a handover destination. It is to be noted that a base station apparatus 400, which will be described hereinafter, is the base station apparatus in a case where any one of the base station apparatus 400a and the base station apparatus 400b is not specified. FIG. 8 shows a scene where a handover procedure is performed from the base station apparatus of a handover source 400a to the base station apparatus of a handover destination 400b.

Figure 9:
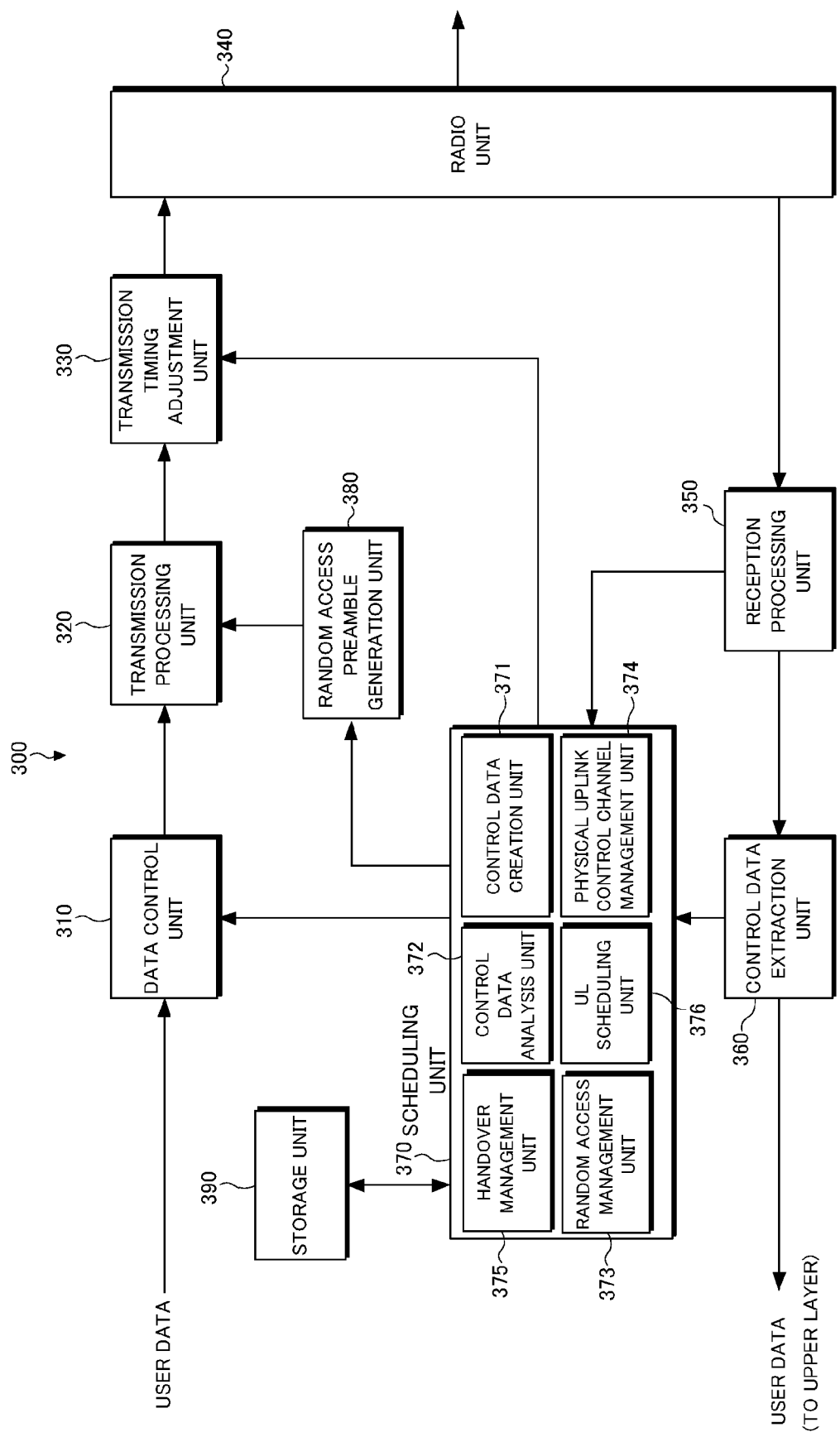
FIG. 9 is a block diagram showing a configuration of a mobile station apparatus of the second embodiment.

FIG. 9 is a block diagram showing a configuration of a mobile station apparatus. As shown in FIG. 9, a configuration of a mobile station apparatus 300 comprises: a data control unit 310; a transmission processing unit 320; a transmission timing adjustment unit 330; a wireless unit 340; a reception processing unit 350; a control data extraction unit 360; a scheduling unit 370; a random access preamble generation unit 380; and a storage unit 390.

User data from an upper layer and control data from the scheduling unit 370 are input into the data control unit 310. The data control unit 310 allocates each data to each channel in accordance with an instruction of the scheduling unit 370, and sends the data to the transmission processing unit 320. The transmission processing unit 320 encodes the data from the data control unit 310 and modulates it. DFT (Discrete Fourier Transform) and IFFT (Inverse Fast Fourier Transform) processing are performed to a modulated signal, and a CP (Cyclic Prefix) is inserted into the signal. The transmission timing adjustment unit 330 adjusts transmission timing of data in accordance with transmission timing gap information passed from the scheduling unit 370. After the transmission timing of the data is adjusted, the data is up-converted into a radio frequency by the wireless unit 340 and is transmitted from a transmission antenna.

Meanwhile, the wireless unit 340 down-converts a wireless signal received from the antenna and passes it to the reception processing unit 350. The reception processing unit 350 performs FFT (Fast Fourier Transform) processing, decoding, demodulation processing, etc. to the signal passed from the wireless unit 340, and passes the demodulated data to the control data extraction unit 360. In addition, the reception processing unit 350 measures a downlink channel quality and passes a measurement result to the scheduling unit 370.

The control data extraction unit 360 determines whether or not the passed data is the data addressed to the mobile station apparatus itself in accordance with C-RNTI (mobile station apparatus identification information) arranged in the physical downlink control channel PDCCH, and separates into control data and user data the data of the physical downlink shared channel PDSCH demodulated by the reception processing unit 350 if the data is the one addressed to the mobile station apparatus itself. In addition, the control data extraction unit 360 detects a response (ACK/NACK) of the data transmitted with the physical uplink shared channel PUSCH. Subsequently, the control data extraction unit 360 passes the control data to the scheduling unit 370 and passes the user data to the upper layer. In addition, if the control data extraction unit 360 detects RA-RNTI (Random Access-Radio Network Temporary Identity) after a random access preamble is transmitted, it passes a random access response message to the scheduling unit 370. In addition to that, the control data extraction unit 360 instructs the scheduling unit 370 to return a response (ACK/NACK) to the received data.

The scheduling unit 370 comprises: a control data creation unit 371; a control data analysis unit 372; a random access management unit 373; a physical uplink control channel management unit 374; a handover management unit 375; and a UL scheduling unit 376.

The control data creation unit 371 creates control data, such as a measurement report message and a handover completion message. The control data analysis unit 372 analyzes control data, such as an HO Command message, a random access response, and a contention resolution from the control data extraction unit 360. Subsequently, the control data analysis unit 372 passes to the UL scheduling scheduling information (allocation information) of data transmitted with the physical uplink shared channel PUSCH, passes information on random access or information on a random access procedure to the random access management unit 373 and the random access preamble generation unit 380, and passes information on a scheduling request and position information of the physical uplink control channel PUCCH to the physical uplink control channel management unit 374.

In addition, the control data analysis unit 372 passes to the handover management unit 375 a handover processing timer included in the HO Command message. It is to be noted that if the control data analysis unit 372 receives the HO Command message, it passes to the storage unit 390 setting information of the base station apparatus of a handover source 400*a*, such as setting information of the current physical uplink control channel PUCCH and generation information of the scheduling request. The UL scheduling unit 376 controls the data control unit 310 based on the scheduling information.

The physical uplink control channel management unit 374 manages the physical uplink control channel PUCCH, generates the scheduling request, creates a response (ACK/NACK) of downlink data received by the control data extraction unit 360, and passes the response to the data control unit 310. Subsequently, if the physical uplink shared channel PUSCH is allocated after the scheduling request is transmitted, the physical uplink control channel management unit 374 cancels transmitting the scheduling request, and if the physical uplink shared channel is not allocated even though the physical uplink control channel management unit 374 transmits the scheduling request up to the maximum number of times of transmission of the scheduling request, the physical uplink control channel management unit 374 reads the setting information of the base station apparatus of a handover source 400*a* from the storage unit 390, and performs scheduling request transmission processing to the base station apparatus of a handover source 400*a*.

If the random access management unit 373 is instructed to perform random access, it selects the preamble number and the position of the random access channel RACH from the information on the random access. Subsequently, the random access management unit 373 informs the random access preamble generation unit 380 of the selected preamble number and position of the random access channel RACH. In addition, the random access management unit 373 confirms a content of the random access response passed from the control data analysis unit 372, and if it detects a preamble number of the transmitted random access preamble, it passes transmission timing gap information to the transmission timing adjustment unit 330. Subsequently, if the random access management unit 373 confirms a contention resolution message, it completes the random access.

The random access preamble generation unit 380 generates a random access preamble of a preamble number specified by the scheduling unit 370. Subsequently, the random access preamble generation unit 380 allocates the random access preamble to the specified position of the random access channel RACH and transmits it to the transmission processing unit 320.

The handover management unit 375 starts a timer when the handover processing timer is passed from the control data analysis unit 372, and if it finishes transmitting a handover completion message by expiration of the timer, it stops the timer. If the timer is completed before the handover completion message is transmitted, the handover management unit 375 determines that the handover has failed, and cancels the scheduling request transmission processing.

The storage unit 390 stores setting information of the base station apparatus 400, and if it receives an instruction from the scheduling unit 370, it provides the stored information. The setting information of the base station apparatus 400 includes: base station apparatus identification information; allocation information of the physical uplink control channel PUCCH; and scheduling request generation information, etc.

Figure 10:
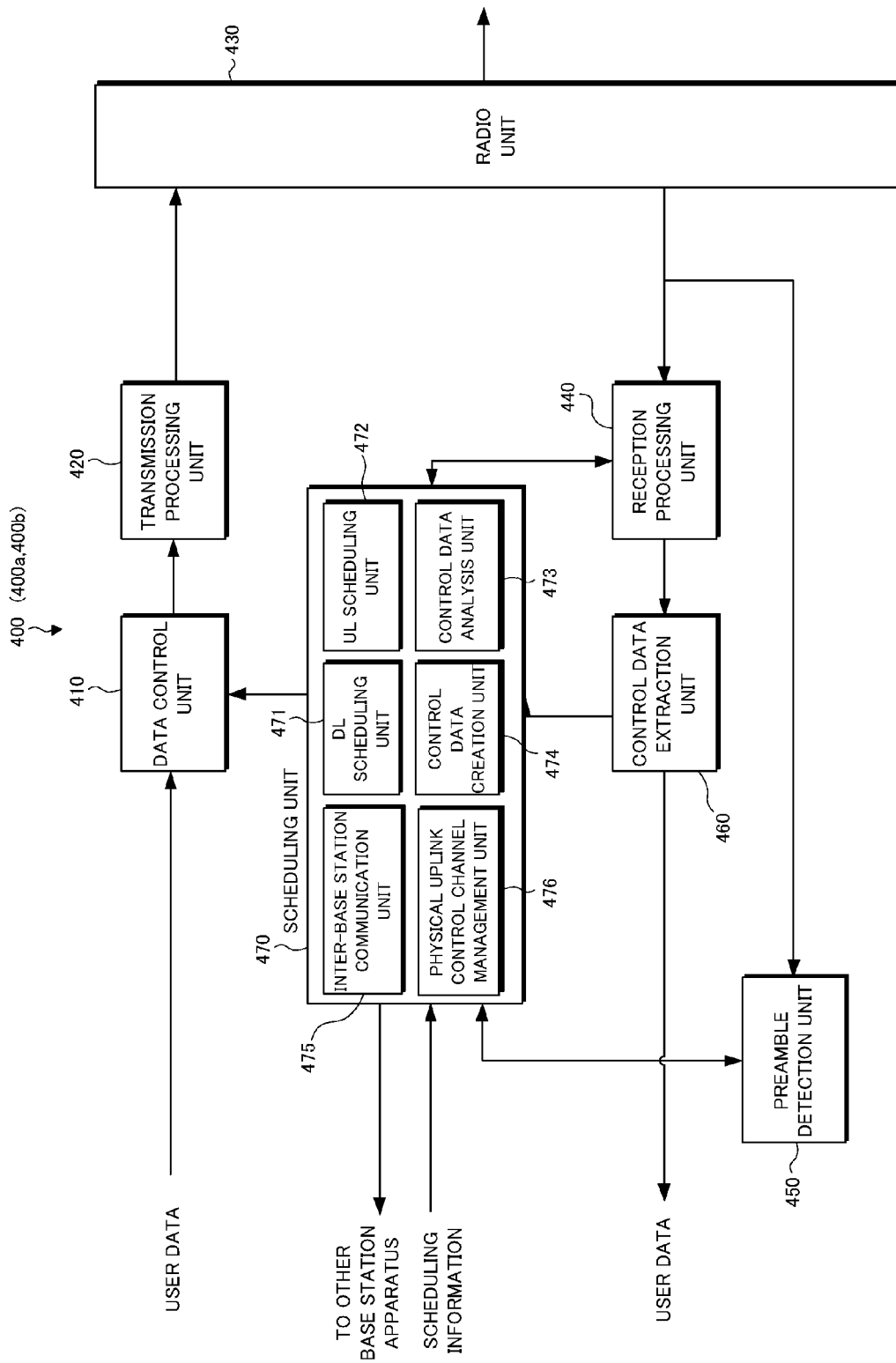
FIG. 10 is a block diagram showing a configuration of a base station apparatus of the second embodiment.

FIG. 10 is a block diagram showing a configuration of a base station apparatus. As shown in FIG. 10, the base station apparatus 400 comprises: a data control unit 410; a transmission processing unit 420; a wireless unit 430; a reception processing unit 440; a preamble detection unit 450; a control data extraction unit 460; and a scheduling unit 470.

In accordance with an instruction from the scheduling unit 470, the data control unit 410 maps control data in the physical downlink control channel PDCCH, the downlink synchronization channel DSCH, the downlink pilot channel DPiCH, the common control physical signaling channel CCPCH, and the physical downlink shared channel PDSCH, and maps transmission data to each mobile station apparatus 300 in the physical downlink shared channel PDSCH.

The transmission processing unit 420 performs data modulation and series/parallel conversion of an input signal, performs OFDM signal processing, such as IFFT (Inverse Fast Fourier Transform) conversion, CP (Cyclic Prefix) insertion, and filtering, to generate an OFDM signal.

The wireless unit 430 up-converts the data modulated with OFDM into a radio frequency, and transmits it to the mobile station apparatus 300. In addition, the wireless unit 430 receives uplink data from the mobile station apparatus 300, down-converts the data into a baseband signal, and passes the received data to the reception processing unit 440 and the preamble detection unit 450. The reception processing unit 440 performs demodulation processing in consideration of transmission processing having performed by the mobile station apparatus 300 in accordance with uplink scheduling information of the scheduling unit 470, and demodulates the data. In addition, the reception processing unit 440 measures an uplink channel quality from the uplink pilot channel UPiCH, and passes a measurement result to the scheduling unit 470. It is to be noted that although an uplink communication system is assumed to be a single carrier system, such as DFT-spread OFDM, a multi carrier system such as the OFDM system may be used.

The control data extraction unit 460 confirms whether the received data is correct or incorrect and informs the scheduling unit 470 of a confirmation result. If the received data is correct, the control data extraction unit 460 separates the received data into user data and control data, and passes the control data to the scheduling unit 470 and passes the user data to the upper layer. In addition, the control data extraction unit 460 also passes to the scheduling unit 470 scheduling request information of the physical uplink control channel, a response (ACK/NACK) to the data of the physical downlink shared channel PDSCH, and downlink CQI.

The scheduling unit 470 comprises: a DL scheduling unit 471; a UL scheduling unit 472; a control data analysis unit 473; a control data creation unit 474; an inter-base station communication unit 475; and a physical uplink control channel management unit 476.

The DL scheduling unit 471 performs scheduling of a downlink. The DL scheduling unit 471 performs scheduling for mapping the user data and the control data in each downlink channel in accordance with the downlink CQI informed by the mobile station apparatus 300, each user's data information informed by the upper layer, and control data created by the control data creation unit 474.

The UL scheduling unit 472 performs scheduling of an uplink. The UL scheduling unit 472 performs scheduling for mapping the user data in the physical uplink shared channel PUSCH based on an uplink channel quality measurement result from the reception processing unit 440 and a scheduling request from the mobile station apparatus 300, and passes a scheduling result to the control data creation unit 474 and the reception processing unit 440. Allocation of a resource block and decision of modulation/encoding system of the data is performed by the scheduling. In addition, if the preamble detection unit 450 informs the UL scheduling unit 472 of detection of the random access preamble, the UL scheduling unit 472 allocates the physical uplink shared channel PUSCH and informs the control data creation unit 474 of scheduling information.

The control data analysis unit 473 analyzes control data of a measurement report message or a handover completion message from the mobile station apparatus 300. Additionally, if the control data analysis unit 473 decides handover from the measurement report, it selects the base station apparatus of a handover destination 400b, and instructs the inter-base station communication unit 475 to perform an HO Request to the selected base station apparatus 400. Subsequently, the control data analysis unit 473 instructs the DL scheduling unit 471 and the UL scheduling unit 472 to start data scheduling and transmission/reception of the data with respect to the mobile station apparatus 300 having completed the handover.

The control data creation unit 474 creates control data, such as a control message including the uplink or downlink scheduling information (allocation information), the response (ACK/NACK) of the data transmitted with the physical uplink shared channel PUSCH, an HO Command message including the allocation information of the physical uplink control channel PUCCH and signal generation information, a random access response message and a contention resolution message including a preamble number, transmission timing gap information, and the scheduling information, and passes the created control data to the data control unit 410.

If the inter-base station communication unit 475 is instructed to perform the HO Request, it creates an HO Request message, and transmits the HO Request message to the base station apparatus 400 to which handover is requested. Subsequently, if the inter-base station communication unit 475 receives an HO Request Ack message from the base station apparatus of a handover destination 400b, it instructs the control data creation unit 474 to create the HO Command message.

The physical uplink control channel management unit 476 allocates to the mobile station apparatus 300 the physical uplink control channels PUCCH for the scheduling request, for the response of the physical downlink shared channel PDSCH, and for transmission of the downlink CQI, respectively. Subsequently, the physical uplink control channel management unit 476 passes the allocation information and generation information of a signal for each application to the control data creation unit 474. In addition, the physical uplink control channel management unit 476 maintains allocation of each physical uplink control channel PUCCH allocated to the mobile station apparatus 300 that performs handover after a certain period after transmitting the HO Command message.

If the preamble detection unit 450 detects the random access preamble in the random access channel RACH, it calculates an amount of transmission timing gap, and reports the detected preamble number and amount of transmission timing gap to the scheduling unit 470.

Figure 11:
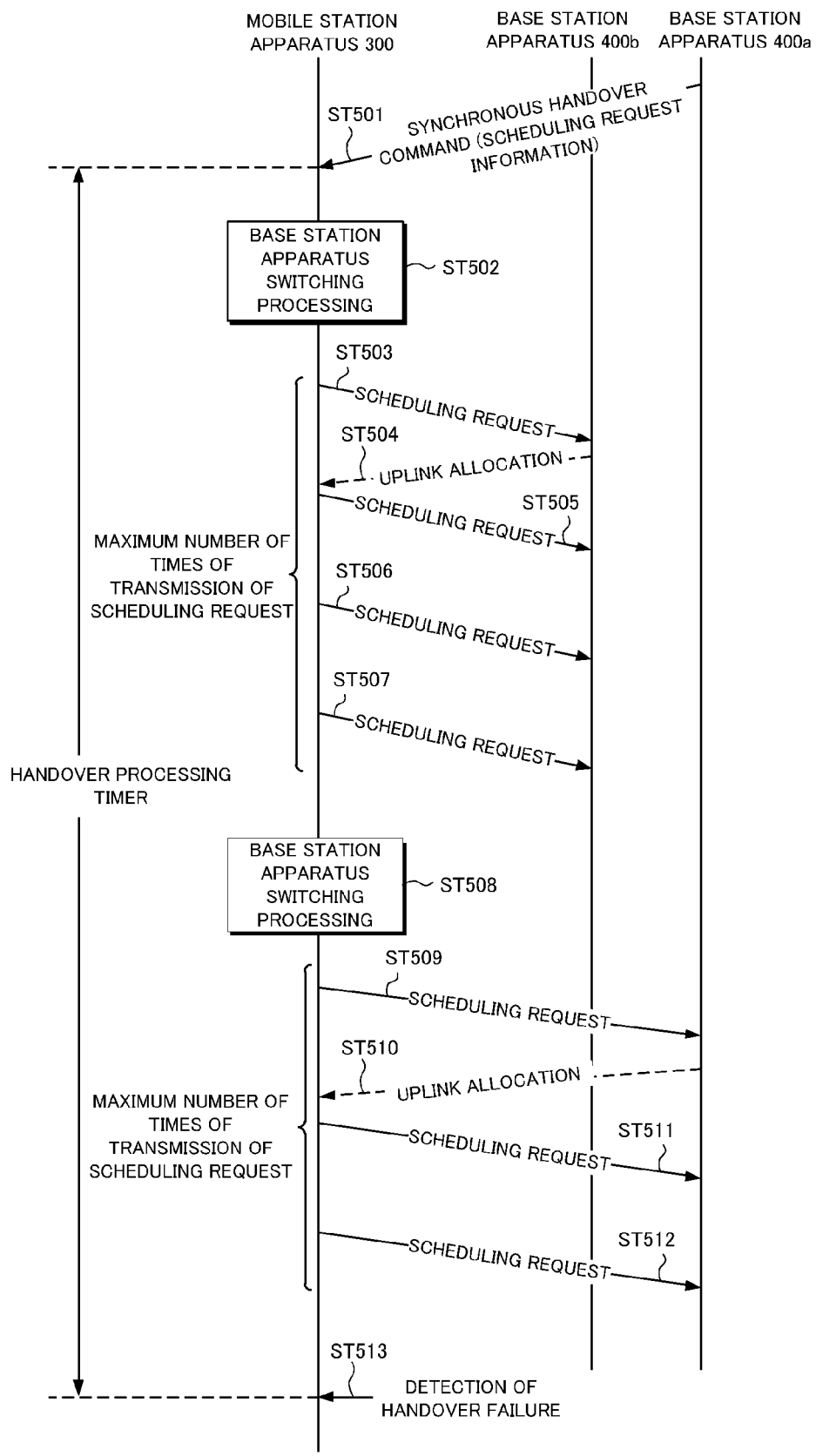
FIG. 11 is a sequence chart showing an operation example of handover.

FIG. 11 is a sequence chart showing an operation example of handover. FIG. 11 shows a summary of one example of a handover procedure when a scheduling request of the physical uplink control channel PUCCH is used.

The base station apparatus of a handover source 400a informs the mobile station apparatus 300 using an HO Command message of information on the base station apparatus of a handover destination 400b, position information of the physical uplink control channel PUCCH of the base station apparatus of a handover destination 400b, information on a scheduling request, information on random access, and C-RNTI, and a handover processing timer (step ST501). It is to be noted that the information on the scheduling request includes information on scheduling request generation and the maximum number of times of transmission of the scheduling request. The information on the random access includes a position of the random access channel RACH, random access preamble generation information, etc.

If the mobile station apparatus 300 receives the HO Command message, it switches a setting of the communication destination from a setting of the base station apparatus of a handover source 400a to a setting of the base station apparatus of a handover destination 400b based on the information of the HO Command message (step ST502). At this time, the mobile station apparatus 300 holds setting information of the base station apparatus of a handover source 400a. The setting information of the base station apparatus of a handover source 400a includes setting information on the physical uplink control channel, etc. Subsequently, the mobile station apparatus 300 generates a scheduling request and transmits the scheduling request with an allocated physical uplink control channel PUCCH (step ST503).

If the mobile station apparatus 300 receives allocation information of the physical uplink shared channel PUSCH, which is a response to the scheduling request, from the base station apparatus of a handover destination 400b, it transmits a handover completion message to an allocated physical uplink shared channel PUSCH. If the mobile station apparatus 300 does not receive the allocation information (step ST504), it transmits the scheduling request again with the allocated physical uplink control channel PUCCH (steps ST505 to ST507).

If the mobile station apparatus 300 cannot receive the allocation information from the base station apparatus of a handover destination 400b even though it transmits the scheduling request up to the maximum number of times of transmission of the scheduling request specified by the HO Command, it restores a setting of the communication destination to a held setting of the base station apparatus 400a (step ST508). Subsequently, the mobile station apparatus 300 creates a scheduling request from information on the scheduling request of the source base station apparatus 400a, and transmits the scheduling request with the physical uplink control channel PUCCH having allocated to the source base station apparatus 400a (step ST509).

If the mobile station apparatus 300 cannot receive uplink allocation information to the scheduling request transmitted from the base station apparatus of a handover source 400a (step ST510), it continues to transmit the scheduling request again (steps ST511 to ST512). Subsequently, if the mobile station apparatus 300 does not receive the uplink allocation information even though the handover processing timer expires, it determines that the handover has failed (step ST513). For example, if the number of times of transmission of the scheduling request is set to be not more than twice, the setting of the communication destination can immediately restore to the setting of the source base station apparatus 400 even if the handover fails, and thus it is convenient to a situation where handover is performed frequently.

Figure 12:
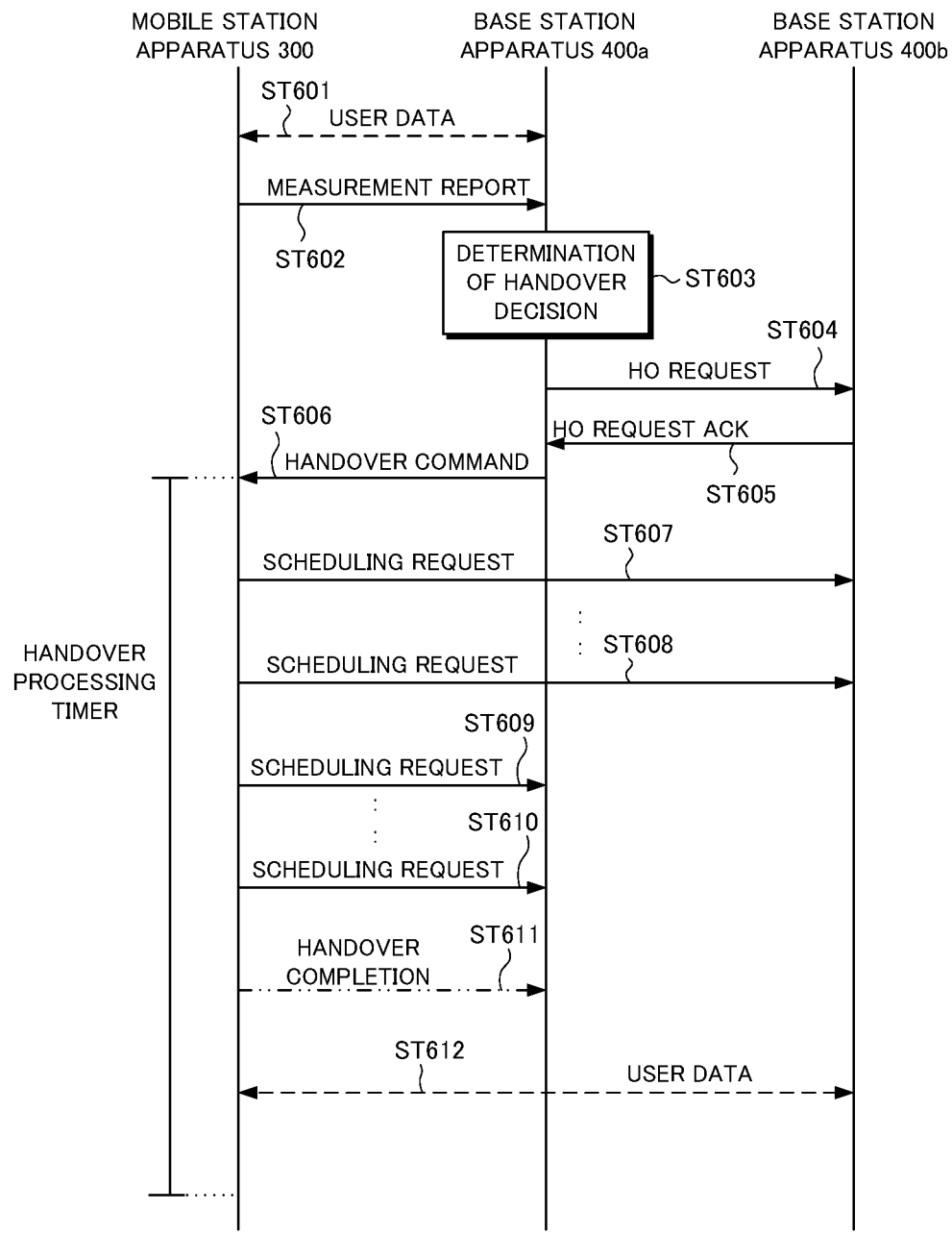
FIG. 12 is a sequence chart showing an operation example of handover.

FIG. 12 is a sequence chart showing an operation example of handover. As shown in FIG. 12, it is assumed that the mobile station apparatus 300 transmits/receives user data to/from the base station apparatus 400a (step ST601). The mobile station apparatus 300 measures a channel quality of another base station apparatus 400 in accordance with an instruction from the base station apparatus 400a, and transmits a measurement report message including a measurement result to the base station apparatus 400a (step ST602). The base station apparatus 400a determines whether to make the mobile station apparatus 300 perform handover based on the measurement report from the mobile station apparatus 300 (step ST603). If the base station apparatus 400a decides to make the mobile station apparatus 300 perform handover to the base station apparatus 400b, the base station apparatus 400a transmits an HO Request message to the base station apparatus 400b (step ST604). At this time, if it is assumed that the base station apparatuses 400a and 400b perform cooperative transmission etc. to the mobile station apparatus 300, and that uplink synchronization is established between the base station apparatus 400b and the mobile station apparatus 300, the base station apparatus 400a also includes a synchronous handover request in the HO Request message.

If the base station apparatus 400b receives the HO Request message, it determines whether to be able to house the mobile station apparatus 300. If the base station apparatus 400b can house the mobile station apparatus 300 and is requested to perform the synchronous handover by the base station apparatus 400a, it transmits to the base station apparatus 400a a HO Request Ack message including information on the base station apparatus 400b, position information of the physical uplink control channel PUCCH of the base station apparatus 400b, information on a scheduling request, information on random access, C-RNTI, and a handover processing timer.

It is to be noted that the information on the base station apparatus 400b includes base station apparatus identification information etc. The position information of the physical uplink control channel PUCCH of the base station apparatus 400b includes range information of the physical uplink control channel PUCCH and allocation information to the mobile station apparatus 300 for transmitting the scheduling request. The information on the scheduling request includes information on scheduling request generation and the maximum number of times of transmission of the scheduling request. The information on the random access includes a position of the random access channel RACH, random access preamble generation information, etc. The C-RNTI is mobile station apparatus identification information.

In the case of asynchronous handover, the base station apparatus 400b transmits to the base station apparatus 400a the HO Request Ack message including information on the base station apparatus 400b, information on random access, C-RNTI, and a handover processing timer (step ST605). The information on the base station apparatus 400b includes base station apparatus identification information etc. The information on the random access includes a position of the random access channel RACH, random access preamble generation information, etc. The C-RNTI is mobile station apparatus identification information.

It is to be noted that the base station apparatus of a handover destination 200b may determine to make the mobile station apparatus 300 execute either of the synchronous handover or the asynchronous handover. Since the base station apparatus of a handover destination 200b can monitor an uplink signal of the mobile station apparatus 300, it can previously determine whether or not there is a gap in the transmission timing of the mobile station apparatus 300.

If the base station apparatus 400a receives the HO Request Ack message from the base station apparatus 400b, it transmits to the mobile station apparatus 300 an HO Command message including a content of the HO Request Ack message (step ST606).

If the mobile station apparatus 300 receives the HO Command message, it switches a setting of the communication destination from a setting of the base station apparatus 400a to a setting of the base station apparatus 400b based on the information of the HO Command message. However, the mobile station apparatus 300 holds setting information of the base station apparatus 400a. If the synchronous handover is instructed by the HO Command message, the mobile station apparatus 300 generates a scheduling request from the information on the scheduling request included in the HO Command, and transmits the scheduling request to the base station apparatus 400b with an allocated physical uplink control channel PUCCH (steps ST607 to ST608).

The mobile station apparatus 300 monitors the physical downlink control channel PDCCH, and if it receives allocation information of the physical uplink shared channel PUSCH, which is a response to the scheduling request, from the base station apparatus 400b, it transmits a handover completion message to an allocated physical uplink shared channel PUSCH. If the mobile station apparatus 300 does not receive the allocation information, it transmits the scheduling request again to the base station apparatus 400b with the allocated physical uplink control channel PUCCH.

If the mobile station apparatus 300 does not receive the allocation information from the base station apparatus 400b even though it transmits the scheduling request up to the maximum number of times of transmission of the scheduling request specified by the HO Command message, it restores a setting of the communication destination to a setting of the base station apparatus 400a using held setting information of the base station apparatus 400a. Subsequently, the mobile station apparatus 300 generates a scheduling request, and transmits the scheduling request to the base station apparatus 400a with the physical uplink control channel PUCCH having allocated to the base station apparatus 400a (steps ST609 to ST610). If the mobile station apparatus 300 receives allocation information from the base station apparatus 400, it completes handover processing (step ST611), and the mobile station apparatus 300 and the base station apparatus 400b transmit/receive user data (step ST612). If the mobile station apparatus 300 does not receive the allocation information from the base station apparatus 400a even though the handover processing timer expires, it determines that the handover has failed.

Figure 13:
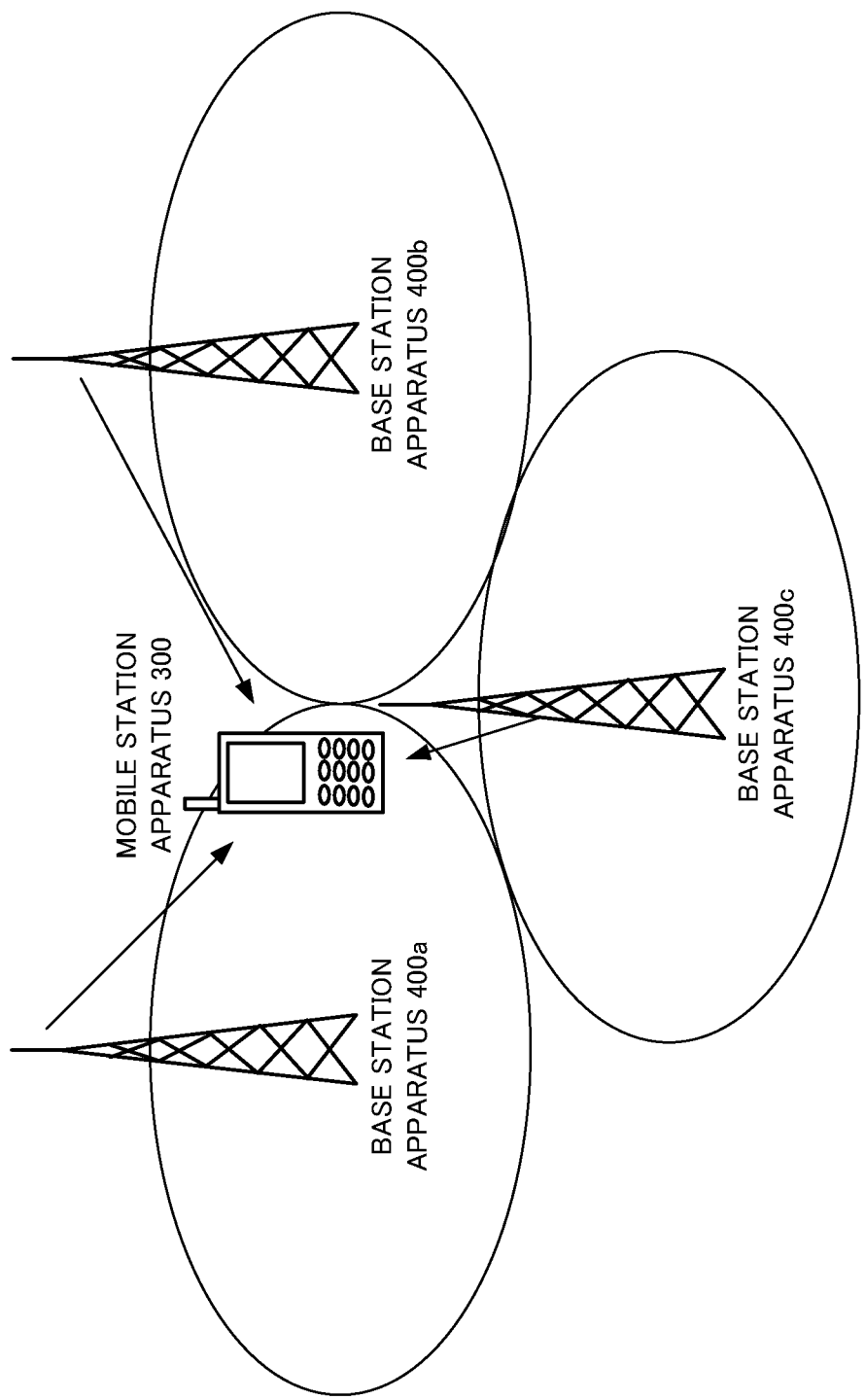
FIG. 13 is a schematic view showing a configuration of a wireless communication system that performs cooperative transmission among three or more base station apparatuses.
Figure 14:
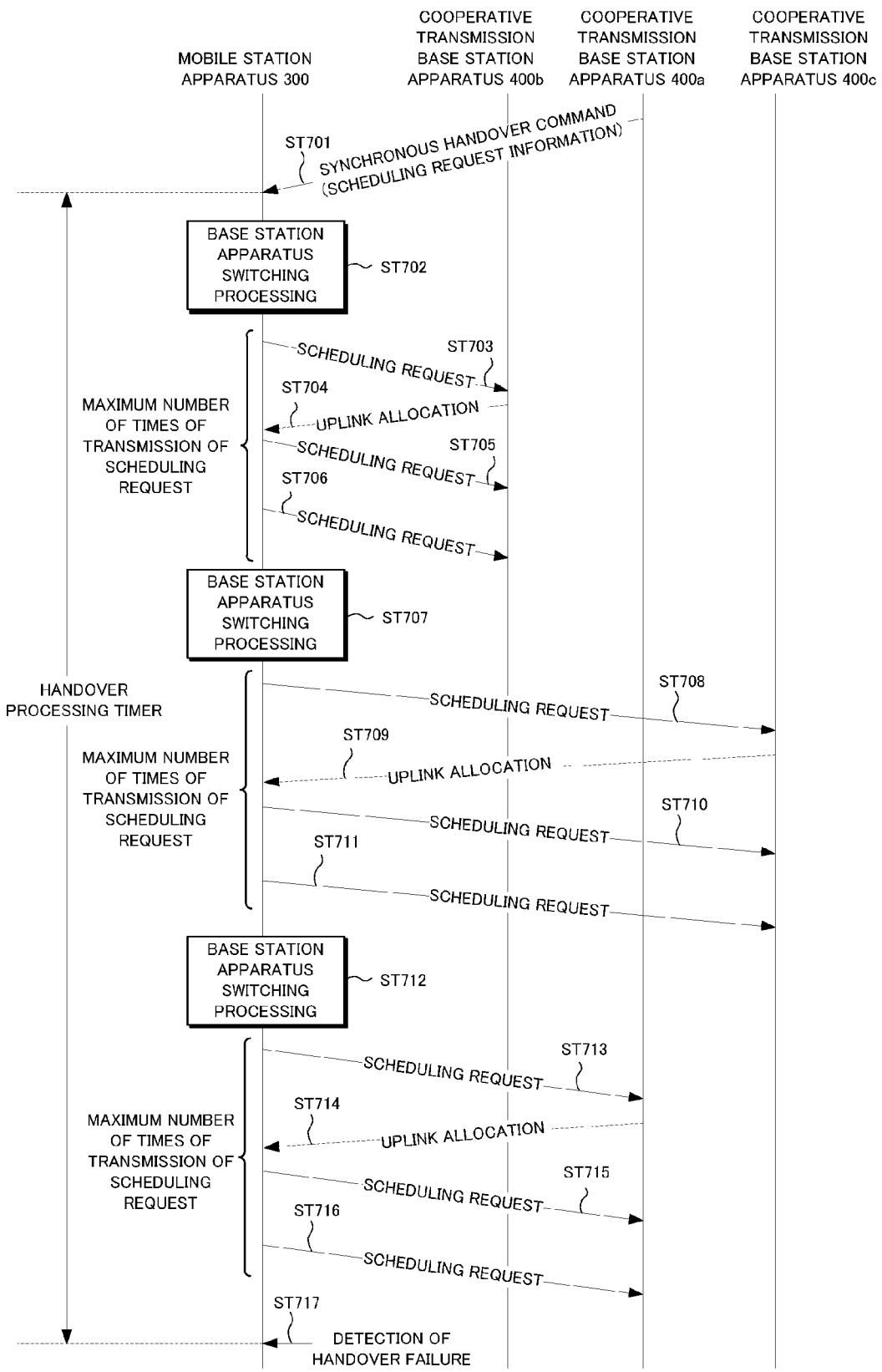
FIG. 14 is a sequence chart showing an operation example of handover.

FIG. 13 is a schematic view showing a configuration of a wireless communication system that performs cooperative transmission among three or more base station apparatuses 400a to 400c. It is to be noted that if cooperative transmission is being performed to the mobile station apparatus 300 among the three or more adjacent base station apparatuses 400a to 400c as shown in FIG. 13, the mobile station apparatus 300 first transmits a scheduling request to the base station apparatus of a handover destination 400b as shown in FIG. 14 (steps ST701 to ST706). Subsequently, if the mobile station apparatus 300 does not receive a response from the base station apparatus of a handover destination 400b, it performs the scheduling request to the base station apparatus 400c performing cooperative transmission (steps ST707 to ST711). Further, if the mobile station apparatus 300 does not receive a response also from the base station apparatus 400c, it transmits the scheduling request to the base station apparatus of a handover source 400a (steps ST712 to ST717). In a manner described above, the mobile station apparatus 300 may perform handover to the base station apparatus 400c performing cooperative transmission.

At this time, the base station apparatus 300 may be informed of an HO Command message including setting information of the base station apparatus 400c performing cooperative transmission and information on the scheduling request. In addition, mobile station apparatus 300 may be previously informed of setting information common to the mobile station apparatuses 300 with which the base station apparatus 400a is communicating, and it may be informed as an HO Command message of individual information set for the individual mobile station apparatus 300, such as setting information of the scheduling request or allocation information of the physical uplink control channel PUCCH. In addition, an order of the base station apparatuses 400a to 400c to which handover is performed is specified, and the mobile station apparatus 300 switches the base station apparatuses 400a to 400c in accordance with the specified order, or if the order is not specified, the mobile station apparatus 300 selects the base station apparatus performing cooperative transmission to perform handover.

Figure 15:
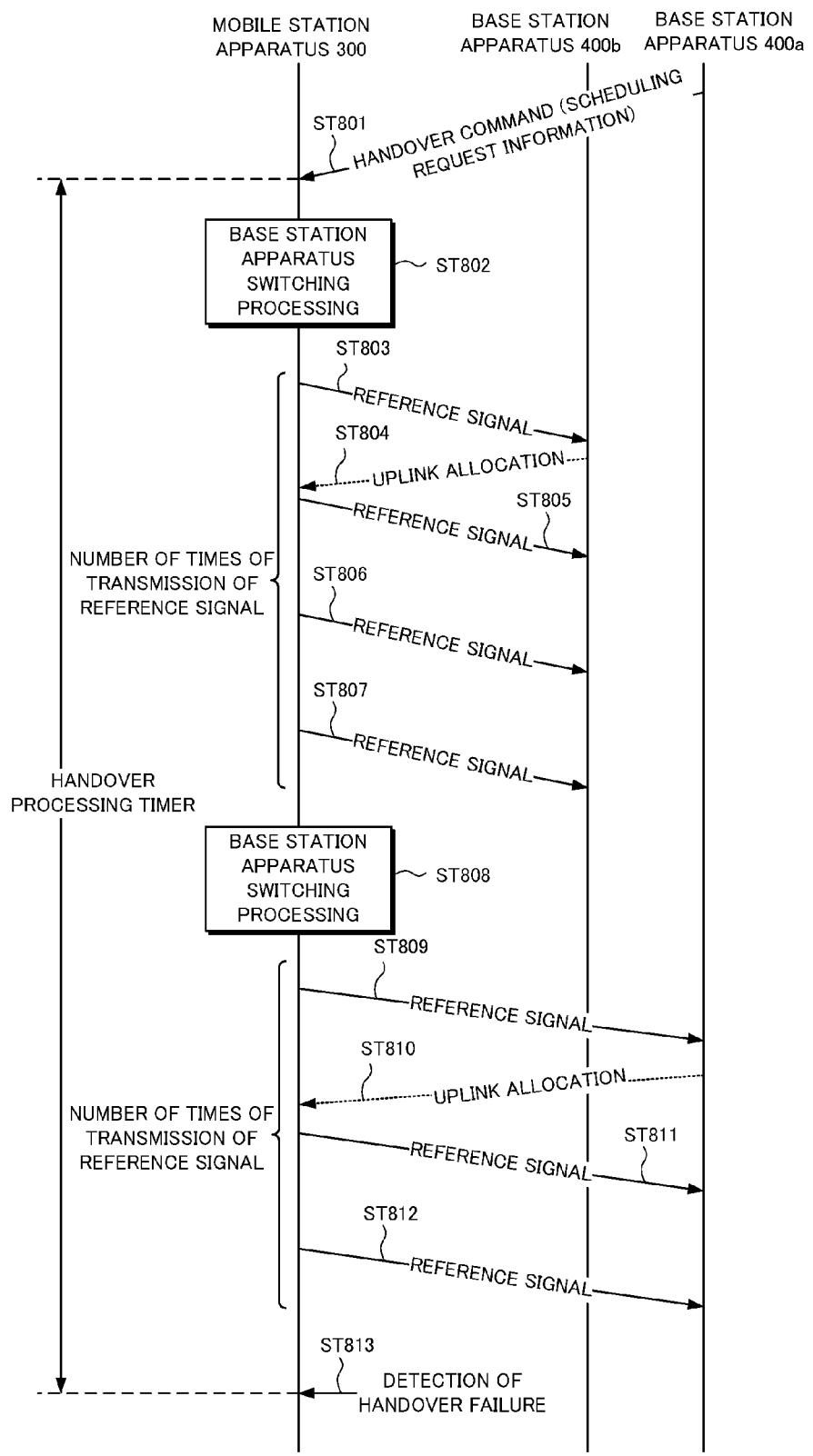
FIG. 15 is a sequence chart showing an operation example of handover.
Figure 16:
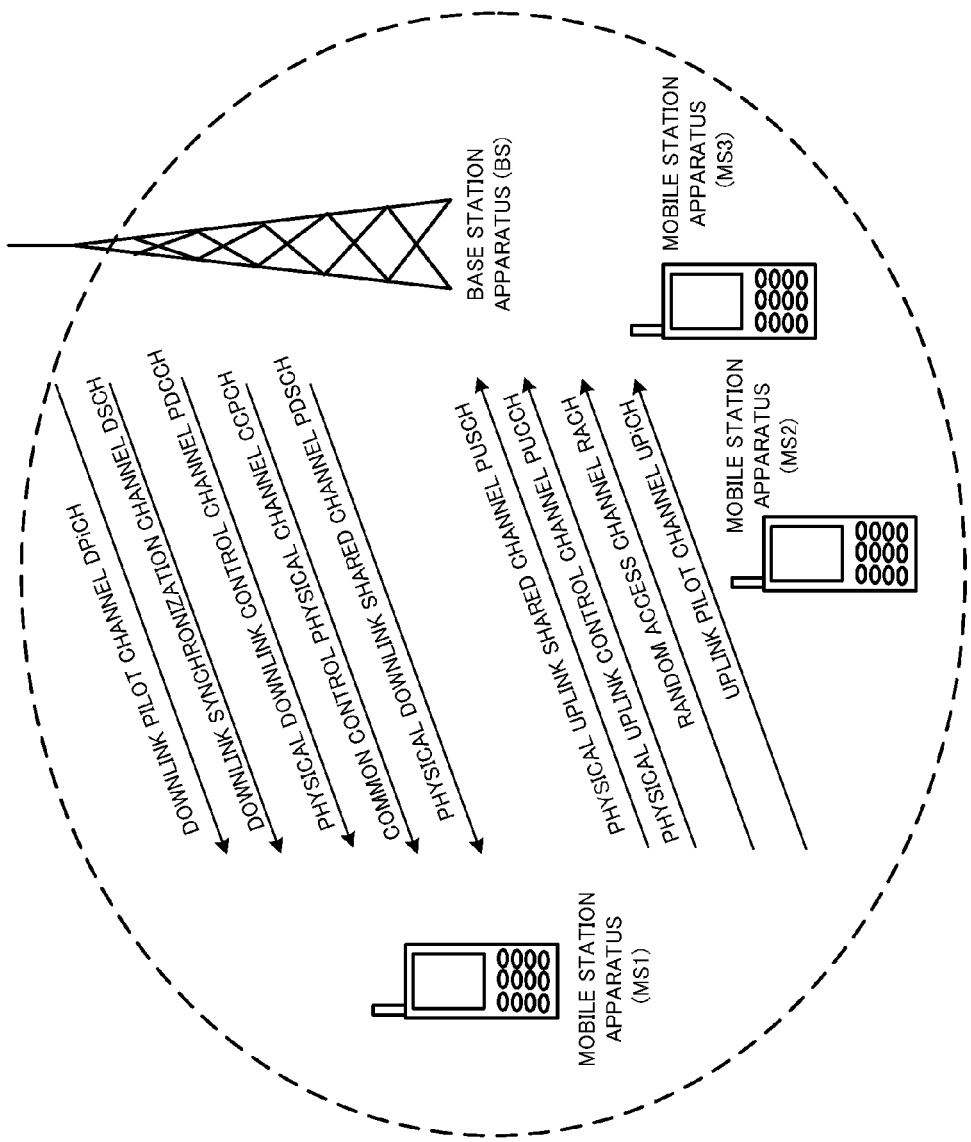
FIG. 16 is a schematic view showing a channel configuration.
Figure 17:
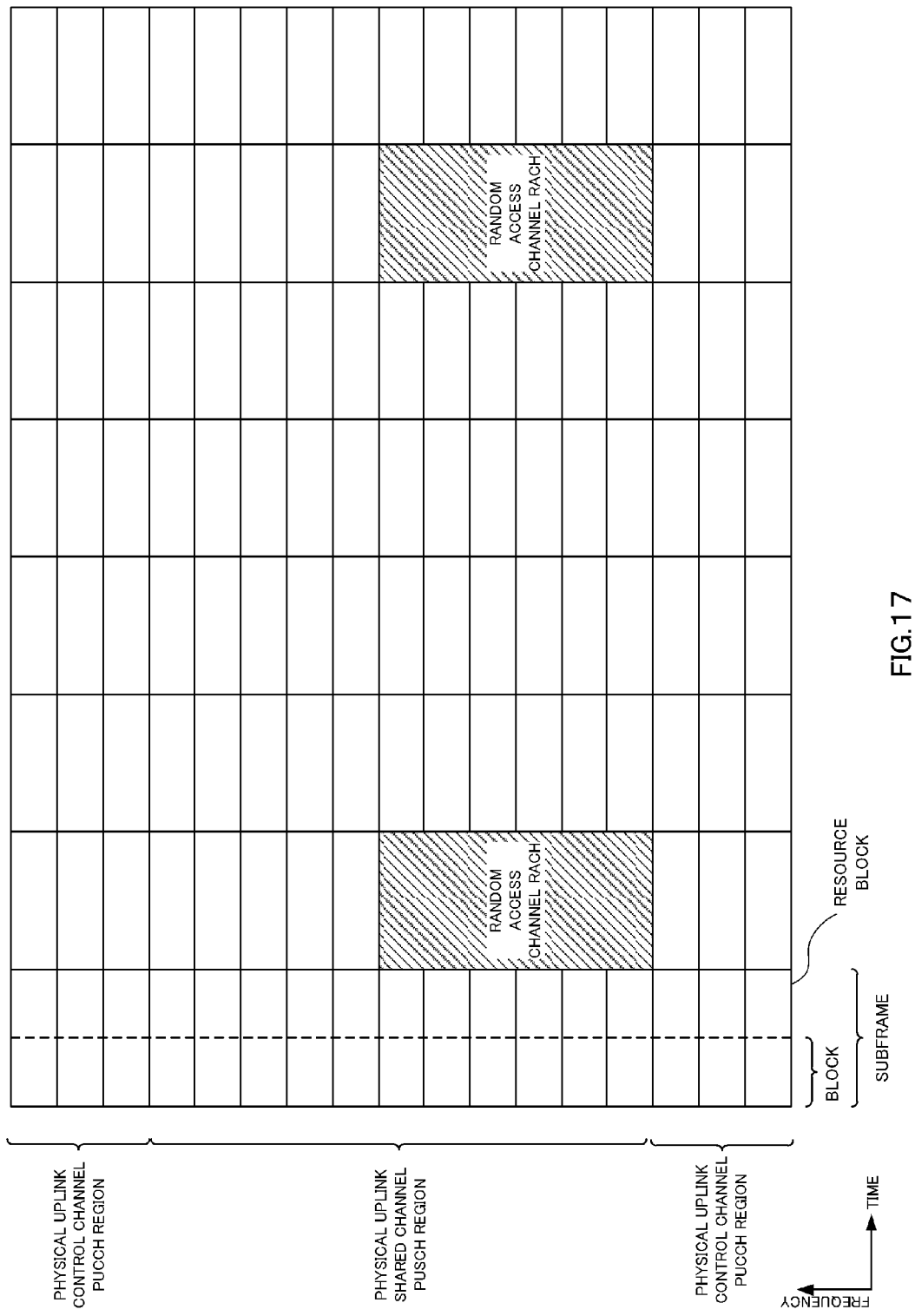
FIG. 17 is an illustration showing a configuration of an uplink.
Figure 18:
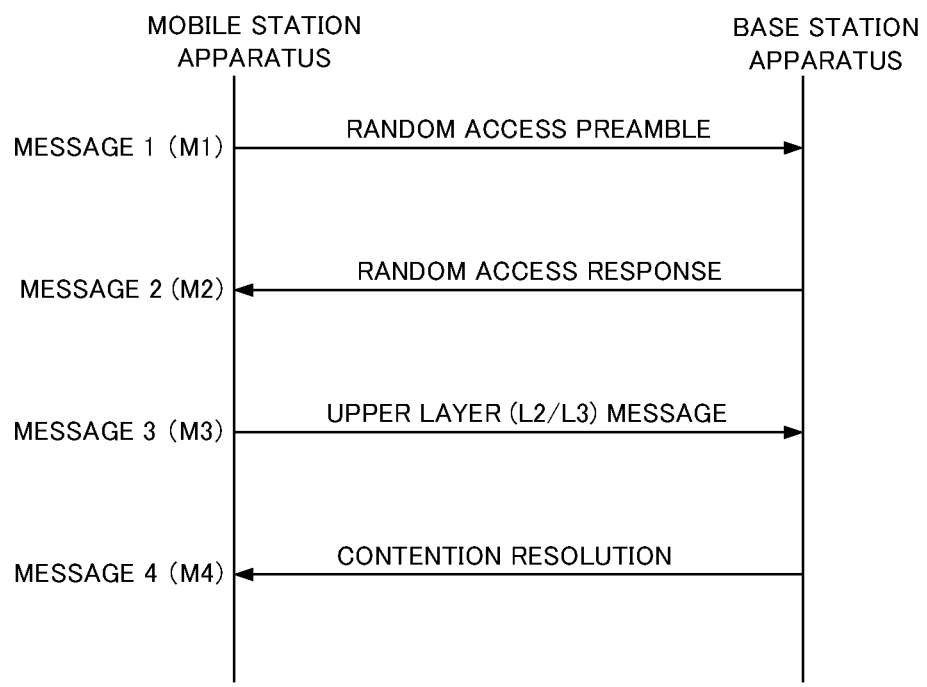
FIG. 18 is a sequence chart showing a random access procedure.
Figure 19:
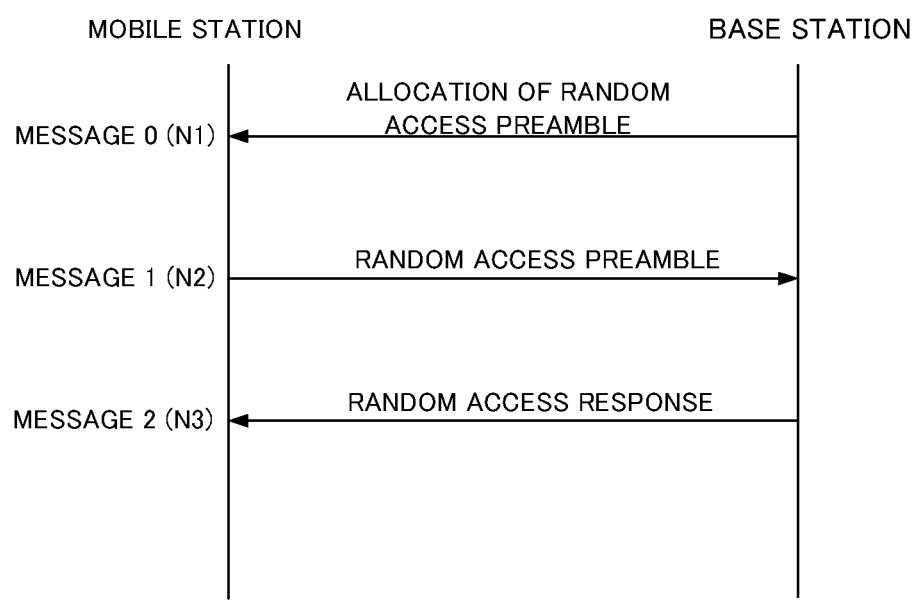
FIG. 19 is a sequence chart showing a random access procedure.
Figure 20:
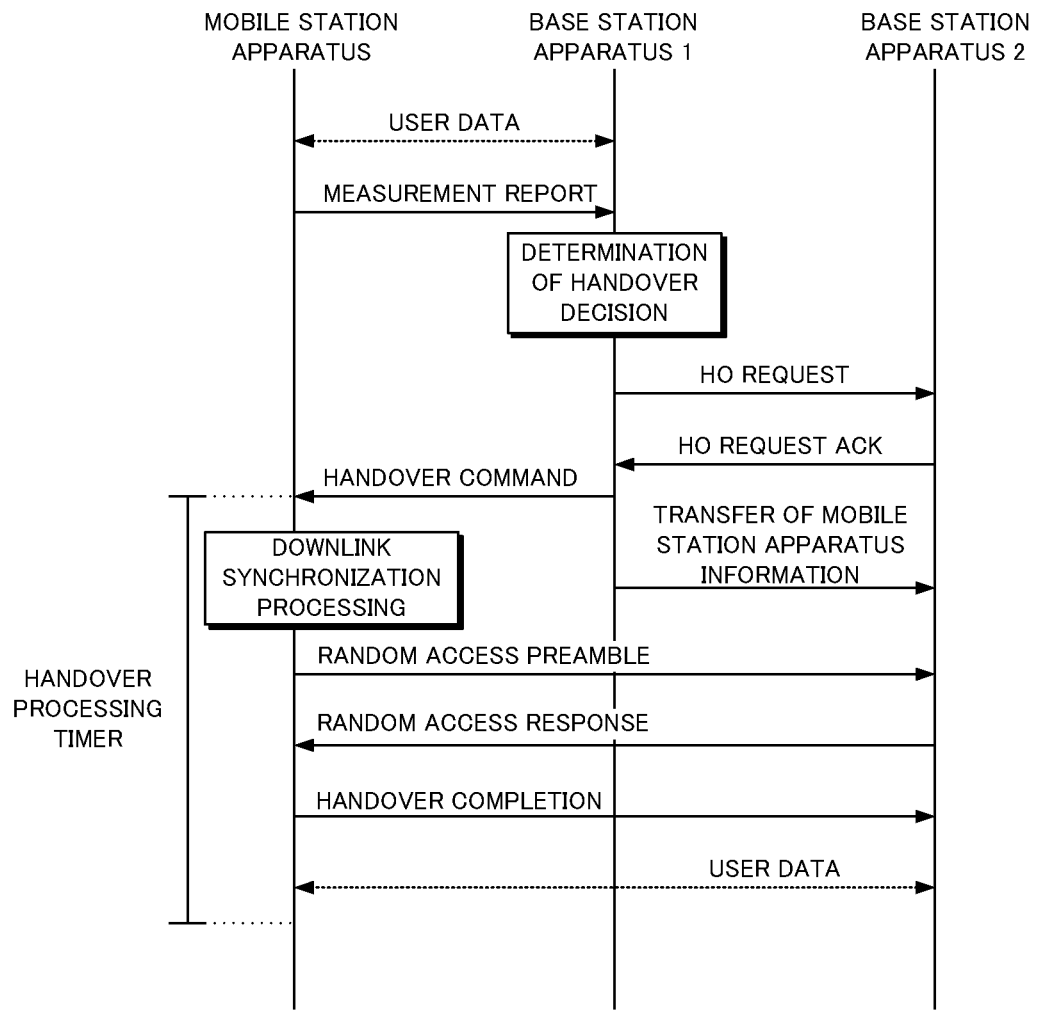
FIG. 20 is a sequence chart showing an example of a handover procedure.
Figure 21:
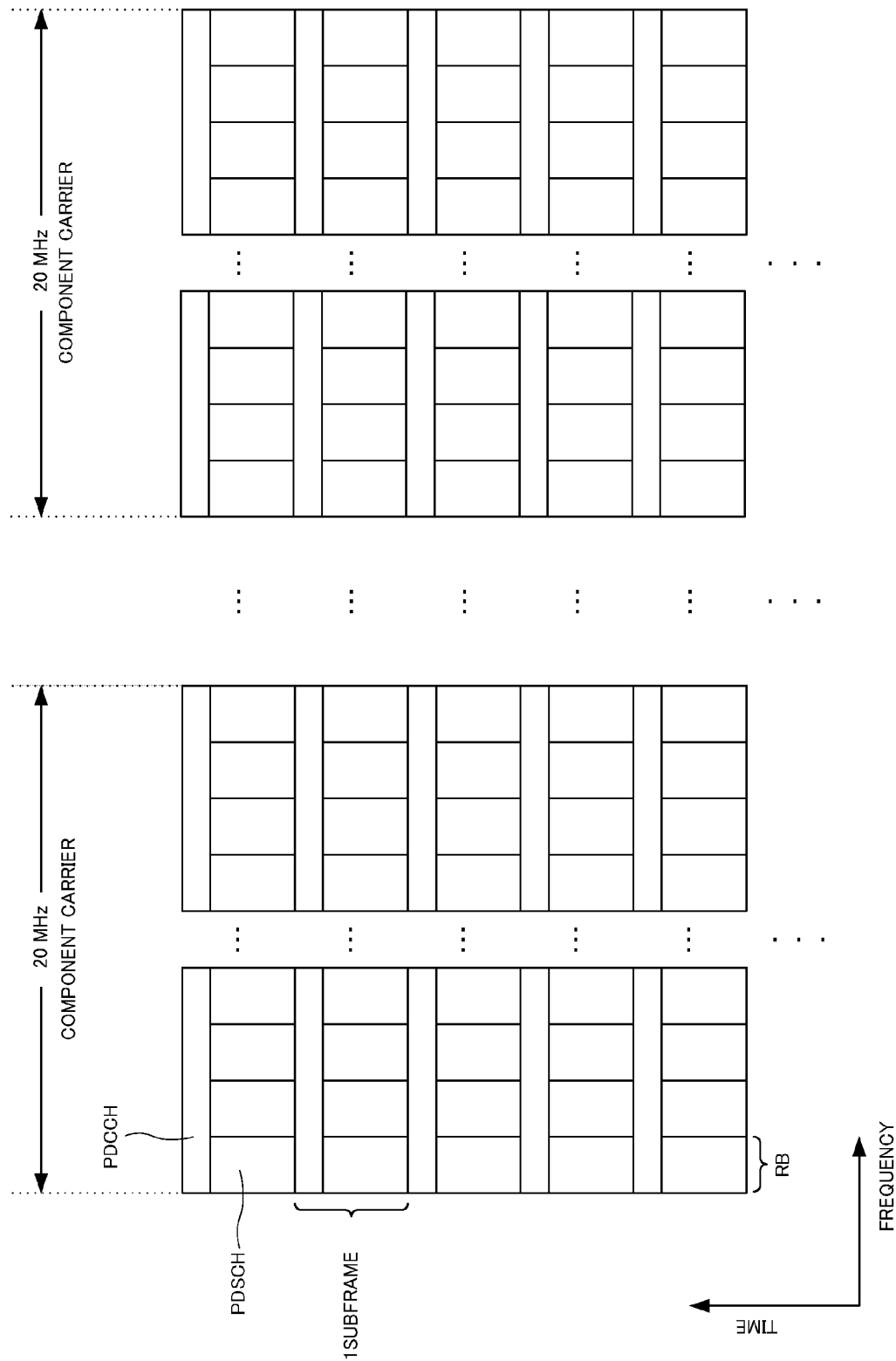
FIG. 21 is an illustration showing component carriers.
Figure 22:
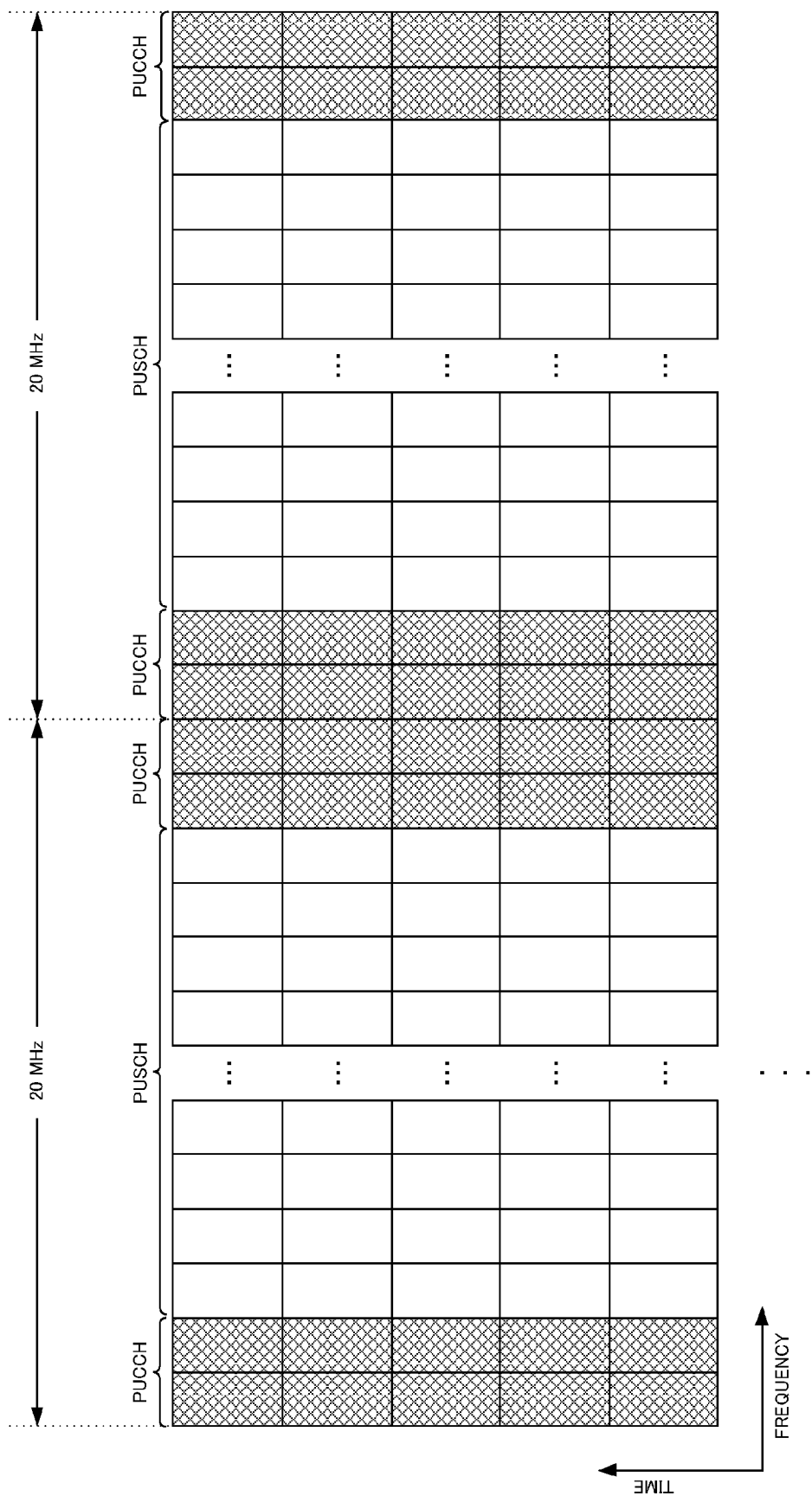
FIG. 22 is an illustration showing component carriers.

FIG. 15 is a sequence chart showing an operation example of handover. FIG. 15 shows a summary of one example of a handover procedure when an uplink pilot channel UPiCH is used. The uplink pilot channel UPiCH includes two kinds of reference signals, i.e., a demodulation reference signal for demodulating the physical uplink shared channel PUSCH and a measurement reference signal for measuring the uplink channel quality. Here, an example will be described where the measurement reference signal is used.

The base station apparatus of a handover source 400a informs the mobile station apparatus 300 using an HO Command message of information on the base station apparatus of a handover destination 400b, setting information on a measurement reference signal of the base station apparatus of a handover destination 400b, information on random access, and C-RNTI, and a handover processing timer (step ST801). If the mobile station apparatus 300 receives the HO Command message, it switches a setting of the connection destination from a setting of the base station apparatus of a handover source 400a to a setting of the base station apparatus of a handover destination 400b based on the information of the HO Command message (step ST802). Subsequently, the mobile station apparatus 300 generates the measurement reference signal and transmits the reference signal in an allocated transmission position (step ST803).

It is to be noted that setting information on the measurement reference signal of the base station apparatus of a handover destination 400b includes: information for generating the measurement reference signal; information on a transmission position/a transmission period of the measurement reference signal; information on a transmission band of the measurement reference signal; and information on the number of times of transmission of the measurement reference signal, etc. In addition, the information on the random access includes a position of the random access channel RACH, random access preamble generation information, etc. The C-RNTI is mobile station apparatus identification information.

If the mobile station apparatus 300 receives allocation information of the physical uplink shared channel PUSCH, which is a response to the reference signal, from the base station apparatus of a handover destination 400b (step ST804), it transmits a handover completion message to an allocated physical uplink shared channel PUSCH. If the mobile station apparatus 300 does not receive the allocation information, it transmits the measurement reference signal again in the allocated transmission position (steps ST805 to ST807).

If the mobile station apparatus 300 cannot receive the allocation information from the base station apparatus of a handover destination 400b even though it transmits the measurement reference signal up to the number of times of transmission of the measurement reference signal specified by the HO Command, it restores a setting of the communication destination to a setting of the base station apparatus 400 using a held setting information of the base station apparatus of a handover source 400a (step ST808). Subsequently, the mobile station apparatus 300 generates a measurement reference signal, and transmits the measurement reference signal to the base station apparatus of a handover source 400a at a position of the measurement reference signal having allocated to the base station apparatus of a handover source 400a (step ST809).

If the mobile station apparatus 300 receives allocation information from the base station apparatus 400 (step ST810), it completes handover processing. If the mobile station apparatus 300 does not receive the allocation information from the base station apparatus 400, it transmits the reference signal up to a predetermined number of times (steps ST811 to ST812). If the mobile station apparatus 300 does not receive the allocation information from the base station apparatus of a handover source 400a even though the handover processing timer expires, it determines that the handover has failed (step ST813).

It is to be noted that although a mobile station apparatus performs a random access procedure or a procedure of restoring a communication destination to a base station apparatus of a handover source if the mobile station apparatus determines that there is no response from a handover destination base station with respect to a predetermined number of uplink transmission in the above-described embodiment, the above-described determination of having no response may be performed based on a time before the response is received regardless of the number of uplink transmission.

DESCRIPTION OF SYMBOLS

50 WIRELESS COMMUNICATION SYSTEM
60 WIRELESS COMMUNICATION SYSTEM
100 MOBILE STATION APPARATUS
110 DATA CONTROL UNIT
120 TRANSMISSION PROCESSING UNIT
130 TRANSMISSION TIMING ADJUSTMENT UNIT
140 WIRELESS UNIT
150 RECEPTION PROCESSING UNIT
160 CONTROL DATA EXTRACTION UNIT
170 SCHEDULING UNIT
171 CONTROL DATA CREATION UNIT
172 CONTROL DATA ANALYSIS UNIT
173 UL SCHEDULING UNIT
174 PHYSICAL UPLINK CONTROL CHANNEL MANAGEMENT UNIT
175 RANDOM ACCESS MANAGEMENT UNIT
176 HANDOVER MANAGEMENT UNIT
180 RANDOM ACCESS PREAMBLE GENERATION UNIT
200 BASE STATION APPARATUS
200a BASE STATION APPARATUS OF A HANDOVER SOURCE
200b BASE STATION APPARATUS OF A HANDOVER DESTINATION
210 DATA CONTROL UNIT

220 TRANSMISSION PROCESSING UNIT
230 WIRELESS UNIT
240 RECEPTION PROCESSING UNIT
250 CONTROL DATA EXTRACTION UNIT
260 SCHEDULING UNIT
261 DL SCHEDULING UNIT
262 UL SCHEDULING UNIT
263 CONTROL DATA ANALYSIS UNIT
264 CONTROL DATA CREATION UNIT
265 INTER-BASE STATION COMMUNICATION UNIT
266 PHYSICAL UPLINK CONTROL CHANNEL MANAGEMENT UNIT
270 PREAMBLE DETECTION UNIT
300 MOBILE STATION APPARATUS
310 DATA CONTROL UNIT
320 TRANSMISSION PROCESSING UNIT
330 TRANSMISSION TIMING ADJUSTMENT UNIT
340 WIRELESS UNIT
350 RECEPTION PROCESSING UNIT
360 CONTROL DATA EXTRACTION UNIT
370 SCHEDULING UNIT
371 CONTROL DATA CREATION UNIT
372 CONTROL DATA ANALYSIS UNIT
373 RANDOM ACCESS MANAGEMENT UNIT
374 PHYSICAL UPLINK CONTROL CHANNEL MANAGEMENT UNIT
375 HANDOVER MANAGEMENT UNIT
376 UL SCHEDULING UNIT
380 RANDOM ACCESS PREAMBLE GENERATION UNIT
390 STORAGE UNIT
400 BASE STATION APPARATUS
400a BASE STATION APPARATUS OF A HANDOVER SOURCE
400b BASE STATION APPARATUS OF A HANDOVER DESTINATION
400c BASE STATION APPARATUS PERFORMING COOPERATIVE TRANSMISSION
410 DATA CONTROL UNIT
420 TRANSMISSION PROCESSING UNIT
430 WIRELESS UNIT
440 RECEPTION PROCESSING UNIT
450 PREAMBLE DETECTION UNIT
460 CONTROL DATA EXTRACTION UNIT
470 SCHEDULING UNIT
471 DL SCHEDULING UNIT
472 UL SCHEDULING UNIT
473 CONTROL DATA ANALYSIS UNIT
474 CONTROL DATA CREATION UNIT
475 INTER-BASE STATION COMMUNICATION UNIT
476 PHYSICAL UPLINK CONTROL CHANNEL MANAGEMENT UNIT

The invention claimed is:

1. A mobile station apparatus that switches a base station apparatus to communicate with by handover, comprising:
receiving a handover command message including scheduled uplink transmission information of a base station apparatus of a handover destination from a base station apparatus of a handover source;
performing uplink transmission to said base station apparatus of a handover destination based on said scheduled uplink transmission information; and
executing a random access procedure to said base station apparatus of a handover destination if a response is not received from said base station apparatus of a handover destination even though a number of times of transmission of said uplink transmission has reached a number of times of transmission specified by said scheduled uplink transmission information, wherein said random access procedure is a procedure in which the mobile station apparatus transmits a random access preamble to the base station apparatus and the mobile station apparatus receives a response to the random access preamble;
determining that handover has failed if the random access procedure is not completed;
receiving a handover command message including uplink shared channel transmission information of a base station apparatus of a handover destination from said base station apparatus of a handover source;
transmitting data to an uplink shared channel of said base station apparatus of a handover destination based on said physical uplink shared channel transmission information; and
executing the random access procedure to said base station apparatus of a handover destination if a response is not received from said base station apparatus of a handover destination even though a number of times of transmission of data to said uplink shared channel has reached a number of times of retransmission of a hybrid ARQ specified by said uplink shared channel transmission information; and
determining that handover has failed if the random access procedure is not completed.

2. The mobile station apparatus according to claim 1, comprising:
receiving a handover command message including physical uplink control channel transmission information of a base station apparatus of a handover destination from said base station apparatus of a handover source;
transmitting a control signal for a physical uplink control channel to said base station apparatus of a handover destination based on said physical uplink control channel transmission information; and
executing the random access procedure to said base station apparatus of a handover destination if a response is not received from said base station apparatus of a handover destination even though a number of times of transmission of said control signal to an uplink control channel has reached a number of times of transmission specified by said uplink control channel transmission information; and
determining that handover has failed if the random access procedure is not completed.

3. The mobile station apparatus according to claim 1, comprising:
receiving a handover command message including physical uplink control channel allocation information and scheduling request transmission information of a base station apparatus of a handover destination from said base station apparatus of a handover source;
transmitting a scheduling request to an uplink control channel allocated in accordance with said uplink control channel allocation information based on the uplink control channel allocation information and the scheduling request transmission information of said base station apparatus of a handover destination; and
executing the random access procedure to said base station apparatus of a handover destination if a response is not received from said base station apparatus of a handover destination even though a number of times of transmission of said scheduling request has reached the maximum number of times of transmission specified by said scheduling request transmission information; and determining that handover has failed if the random access procedure is not completed.

4. The mobile station apparatus according to claim 1, comprising:
receiving a handover command message including reference signal transmission information of a base station apparatus of a handover destination from said base station apparatus of a handover source;
transmitting a reference signal to said base station apparatus of a handover destination based on said reference signal transmission information; and
executing the random access procedure to said base station apparatus of a handover destination if a response is not received from said base station apparatus of a handover destination even though a number of times of transmission of said reference signal has reached a number of times of transmission specified by said reference signal transmission information; and
determining that handover has failed if the random access procedure is not completed.

5. The mobile station apparatus according to claim 1, comprising determining that handover has failed if a timer included in said handover command message expires during execution of the handover based on said received handover command message.

6. A wireless communication system in which a mobile station apparatus switches a base station apparatus to communicate with by handover, wherein
a base station apparatus of a handover source decides execution of handover in accordance with a measurement report received from a mobile station apparatus in communication, and transmits a handover command message including scheduled uplink transmission information of a base station apparatus of a handover destination and information on random access to a base station of a handover destination to said mobile station apparatus, and wherein
the mobile station apparatus having received said handover command message performs uplink transmission to said base station apparatus of a handover destination based on said scheduled uplink transmission information included in said handover command message, and executes a random access procedure to said base station apparatus of a handover destination if a response from said base station apparatus of a handover destination is not received with respect to said uplink transmission even though a number of times of transmission of said uplink transmission has reached a number of times of transmission specified by said uplink transmission information, wherein said random access procedure is a procedure in which the mobile station apparatus transmits a random access preamble to the base station apparatus and the mobile station apparatus receives a response to the random access preamble, and determines that handover has failed if the random access procedure is not completed,
the mobile station apparatus having received said handover command message including uplink shared channel transmission information of a base station apparatus of a handover destination from said base station apparatus of a handover source, transmits data to an uplink shared channel of said base station apparatus of a handover destination based on said physical uplink shared channel transmission information, and executes the random access procedure to said base station apparatus of a handover destination if a response is not received from said base station apparatus of a handover destination even though a number of times of transmission of data to said uplink shared channel has reached a number of times of retransmission of a hybrid ARQ specified by said uplink shared channel transmission information, and determines that handover has failed if the random access procedure is not completed.

7. A wireless communication method in which a mobile station apparatus switches a base station apparatus to communicate with by handover, wherein
a base station apparatus of a handover source decides execution of handover in accordance with a measurement report received from a mobile station apparatus in communication, and transmits a handover command message including scheduled uplink transmission information of a base station apparatus of a handover destination and information on random access to a base station apparatus of a handover destination to said mobile station apparatus in communication, and wherein
the mobile station apparatus having received said handover command message performs uplink transmission to said base station apparatus of a handover destination based on said scheduled uplink transmission information included in said handover command message, and executes a random access procedure to said base station apparatus of a handover destination if a response from said base station apparatus of a handover destination is not received with respect to said uplink transmission even though a number of times of transmission of said uplink transmission has reached a number of times of transmission specified by said uplink transmission information, wherein said random access procedure is a procedure in which the mobile station apparatus transmits a random access preamble to the base station apparatus and the mobile station apparatus receives a response to the random access preamble, and determines that handover has failed if the random access procedure is not completed,
the mobile station apparatus having received said handover command message including uplink shared channel transmission information of a base station apparatus of a handover destination from said base station apparatus of a handover source, transmits data to an uplink shared channel of said base station apparatus of a handover destination based on said physical uplink shared channel transmission information, and executes the random access procedure to said base station apparatus of a handover destination if a response is not received from said base station apparatus of a handover destination even though a number of times of transmission of data to said uplink shared channel has reached a number of times of retransmission of a hybrid ARQ specified by said uplink shared channel transmission information, and determines that handover has failed if the random access procedure is not completed.

* * * * *